(12) United States Patent
Mendoza et al.

(10) Patent No.: US 12,494,475 B2
(45) Date of Patent: Dec. 9, 2025

(54) BATTERY ELECTRODE CONTINUOUS CASTING SHOE, MACHINE AND METHOD

(71) Applicant: Wirtz Manufacturing Company, Inc., Port Huron, MI (US)

(72) Inventors: Roel Mendoza, Palms, MI (US); Aleksandar Mrdenovic, Fort Gratiot, MI (US); Michael Romeo, St. Clair, MI (US); John O. Wirtz, Fort Gratiot, MI (US)

(73) Assignee: Wirtz Manufacturing Company, Inc., Port Huron, MI (US)

( * ) Notice: Subject to any disclaimer, the term of this patent is extended or adjusted under 35 U.S.C. 154(b) by 0 days.

(21) Appl. No.: 18/644,815

(22) Filed: Apr. 24, 2024

(65) Prior Publication Data

US 2024/0274786 A1 Aug. 15, 2024

Related U.S. Application Data

(60) Division of application No. 17/441,053, filed as application No. PCT/US2019/054796 on Oct. 4, (Continued)

(51) Int. Cl.
*B22D 11/06* (2006.01)
*H01M 4/04* (2006.01)
(Continued)

(52) U.S. Cl.
CPC ....... *H01M 4/0485* (2013.01); *B22D 11/0637* (2013.01); *B22D 11/064* (2013.01);
(Continued)

(58) Field of Classification Search
CPC ...... H01M 4/0485; H01M 4/84; B22D 25/04; B22D 11/06; B22D 11/0634; B22D 11/0637; B22D 11/064
(Continued)

(56) References Cited

U.S. PATENT DOCUMENTS 4,266,597 A 5/1981 Eberle
4,349,067 A 9/1982 Wirtz et al.
(Continued)

FOREIGN PATENT DOCUMENTS

CN 102240785 A 11/2011

OTHER PUBLICATIONS

Supplementary European Search Report for European Application No. 19920217.7 dated Apr. 17, 2023 (13 pages).
(Continued)

*Primary Examiner* — Kevin P Kerns
(74) *Attorney, Agent, or Firm* — REISING ETHINGTON, P.C.

(57) ABSTRACT

A shoe for dispensing a molten metal such as lead into a mold cavity of a rotating drum to continuously cast a web of a plurality of serially connected grids or battery composite electrodes of a carbon fiber material with a cast metal conductor. The shoe may have at least one elongate orifice slot in a face confronting the drum, a molten metal supply passage communicating with the orifice slot and an excess molten metal return slot opening into the confronting face downstream of the supply slot relative generally to the direction of rotation of the drum.

20 Claims, 25 Drawing Sheets

Related U.S. Application Data 2019, now Pat. No. 12,002,943, which is a continuation-in-part of application No. PCT/US2019/027144, filed on Apr. 12, 2019.

(60) Provisional application No. 62/820,580, filed on Mar. 19, 2019.

(51) Int. Cl.
*H01M 4/22* (2006.01)
*H01M 4/583* (2010.01)
*H01M 4/66* (2006.01)
*H01M 4/68* (2006.01)
*H01M 4/84* (2006.01)
*H01M 10/06* (2006.01)
*H01M 10/12* (2006.01)
*H01M 10/14* (2006.01)
*H01M 4/02* (2006.01)

(52) U.S. Cl.
CPC ............ *H01M 4/22* (2013.01); *H01M 4/583* (2013.01); *H01M 4/661* (2013.01); *H01M 4/685* (2013.01); *H01M 4/84* (2013.01); *H01M 10/06* (2013.01); *H01M 10/12* (2013.01); *H01M 10/14* (2013.01); *H01M 2004/021* (2013.01)

(58) Field of Classification Search
USPC ....... 164/419, 423, 427, 429, 437, 461, 462, 164/463, 479
See application file for complete search history.

(56) References Cited

U.S. PATENT DOCUMENTS

| | | |
|---|---|---|
| 4,544,014 A | 10/1985 | McLane et al. |
| 4,545,422 A | 10/1985 | McLane et al. |
| 5,015,438 A | 5/1991 | Ashok et al. |
| 5,497,822 A | 3/1996 | Schenk |
| 12,002,943 B2 * | 6/2024 | Mendoza et al. ....... H01M 4/16 |
| 12,002,966 B2 * | 6/2024 | Romeo et al. .......... H01M 4/84 |
| 2017/0346068 A1 | 11/2017 | Abrahamson et al. |
| 2018/0366719 A1 | 12/2018 | Abrahamson et al. |

OTHER PUBLICATIONS

Brazilian Office Action for Brazilian Application No. BR112020020960-0 dated Jan. 10, 2023 (4 pages).
English Translation of Brazilian Office Action for Brazilian Application No. 112020020960-0 dated Jan. 10, 2023 (2 pages).
Supplementary Partial European Search Report for EP Application No. 19920217 dated Nov. 25, 2022 (11 pages).
Indian Office Action for Indian Application No. 202037043754 dated Jun. 30, 2022 (7 pages).
International Search Report and Written Opinion for International Application No. PCT/US19/27144 dated Jul. 1, 2019 (13 pages).
European Search Report for European Patent Application No. EP24166421 dated Aug. 29, 2024 (8 pages).

* cited by examiner

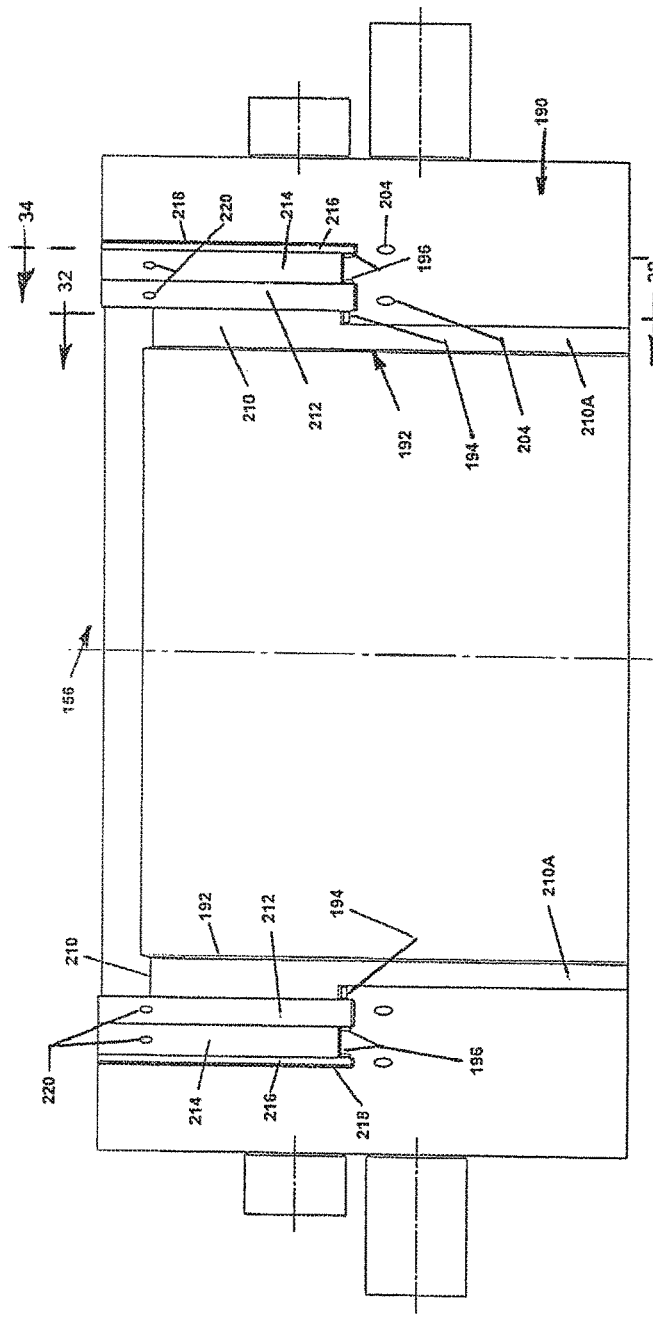
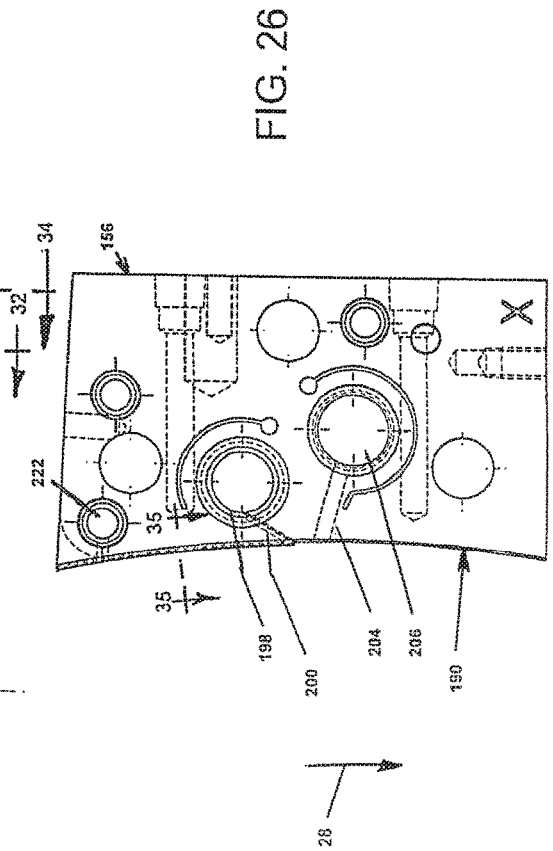
FIG. 25
FIG. 26

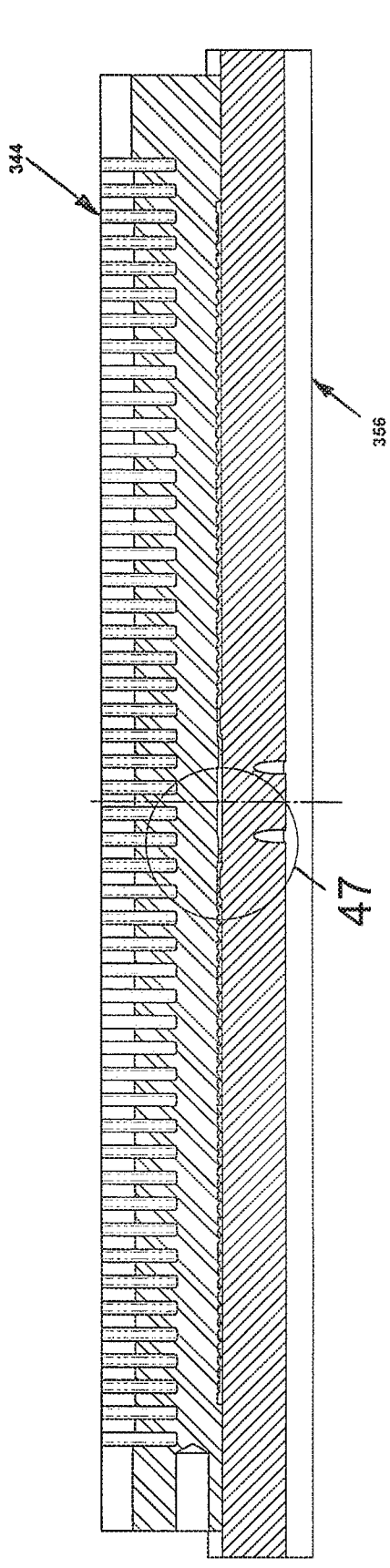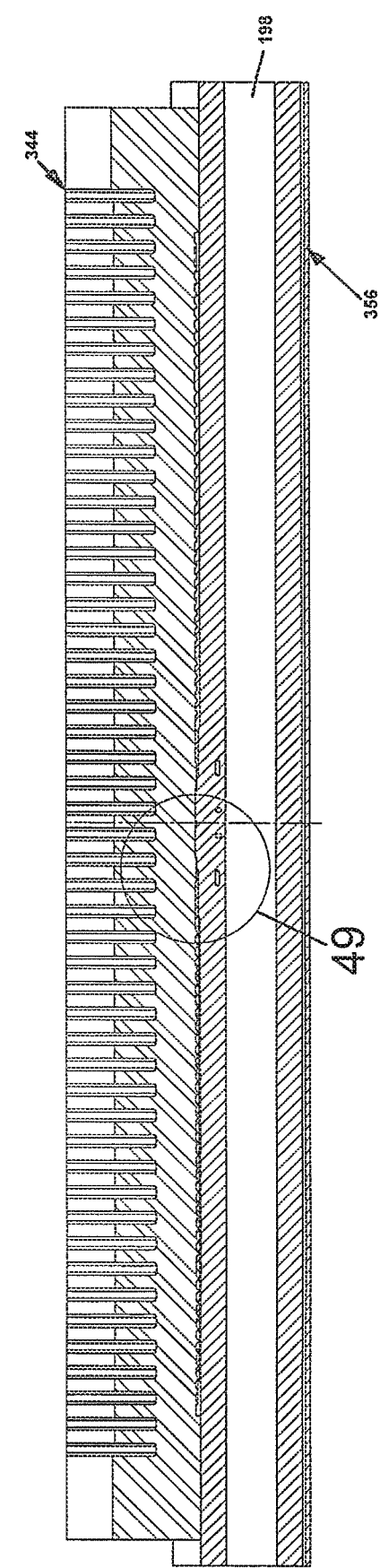

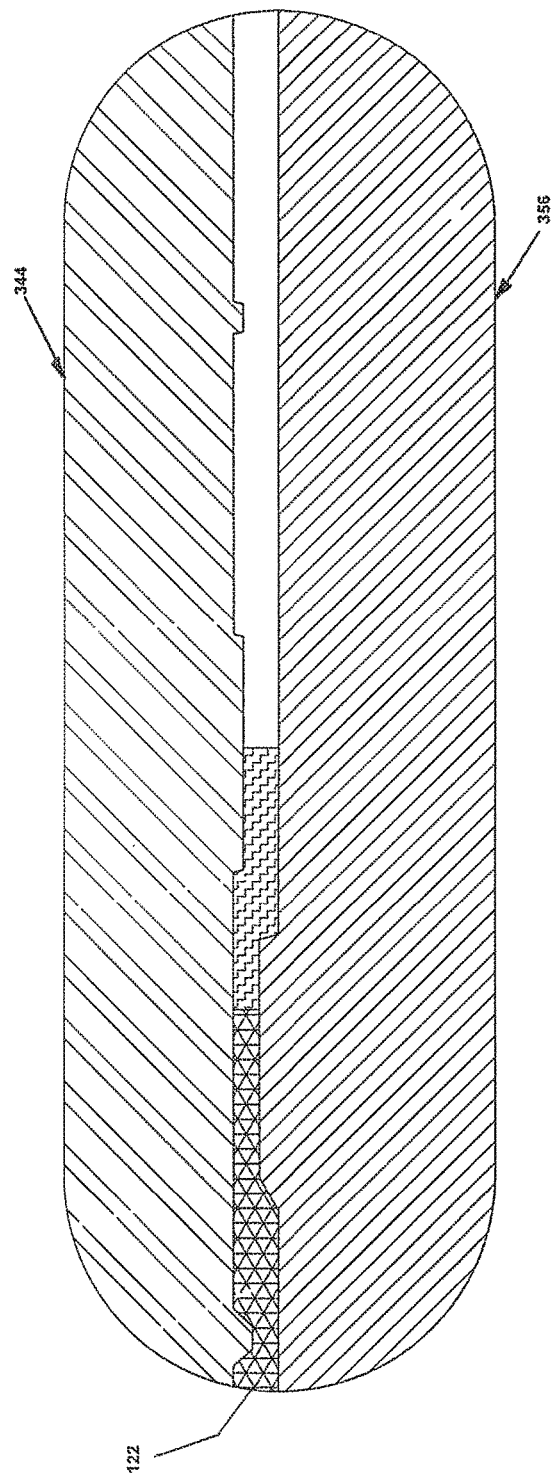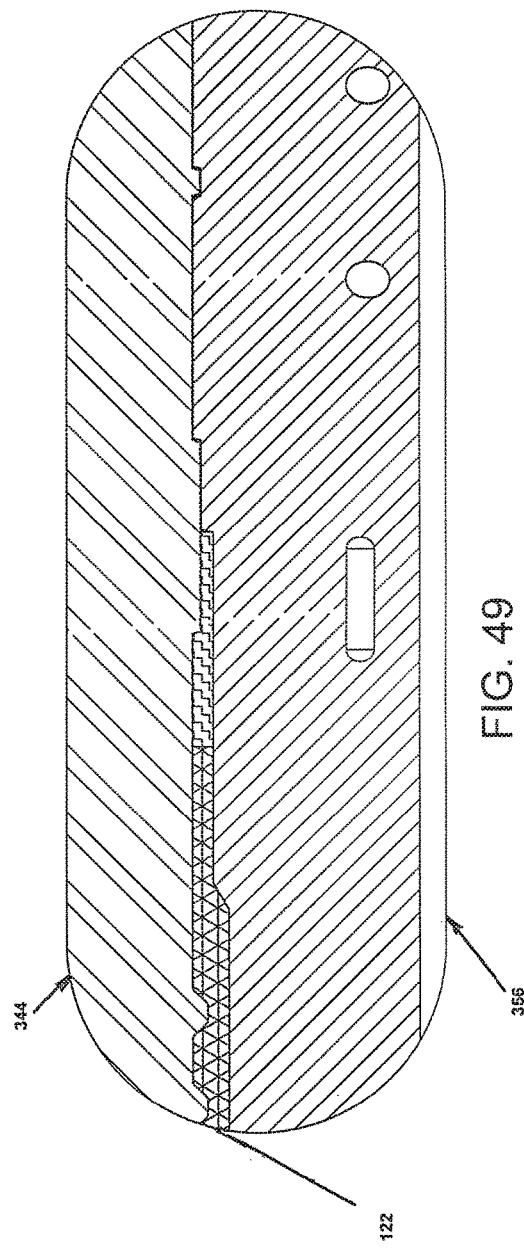

BATTERY ELECTRODE CONTINUOUS CASTING SHOE, MACHINE AND METHOD

REFERENCE TO RELATED APPLICATIONS

This application is a division of U.S. application Ser. No. 17/441,053 filed on Sep. 20, 2021 and now issued as U.S. Pat. No. 12,002,943 filed as PCT/US2019/054796 on Oct. 4, 2019 which is a continuation-in-part of PCT/US2019/027144 filed on Apr. 12, 2019 which claims the benefit of U.S. provisional application 62/820,580 filed on Mar. 19, 2019, the entire contents of each of which is incorporated herein by reference in its entirety.

TECHNICAL FIELD

This invention relates to battery grids or electrodes and more particularly to a battery grid or electrode continuous casting shoe, drum, machine, and method.

BACKGROUND

Various machines for casting lead acid battery grids in a continuous manner have been developed. Some of these machines have a rotary drum usually of steel with a mold cavity of a plurality of the desired battery grid pattern formed in a cylindrical peripheral surface of the drum and a shoe of a highly thermally conductive metal such as aluminum-bronze or steel positioned in confronting and close fitting relationship with an arcuate segment of the drum. The shoe typically has a generally axially extending orifice slot opening onto the mold cavity of the drum. Typically, excess molten lead is supplied at a super atmospheric pressure to the orifice slot to fill the portion of the mold of the drum rotating past the slot to thereby continuously cast an elongated web or strip of connected successive battery grids. The excess molten lead is directed back to a lead pot of a furnace which melts the lead supplied to the orifice and maintains it in a molten condition in the pot.

Such a continuous casting machine and shoe of lead-acid battery grids is disclosed in U.S. Pat. No. 4,415,016 assigned to the applicant of this patent application. Prior art shoes for battery grid continuous casting machines of lead-acid battery grids are also disclosed in U.S. Pat. Nos. 4,544,014 and 4,545,422 assigned to the applicant of this application. This type of machine produces satisfactory lead-acid battery grids when operated under carefully controlled conditions particularly if the temperatures of portions of the shoe and the drum are maintained within selected narrow ranges. However, various problems have occurred when attempting to consistently produce lead grids of the highest quality at a high speed or rate of production over a long period of continuous machine operation. When operating over a prolonged period of continuous production, some of the problems have been flashing of lead between the grooves of the drum mold and thus flashing on the wires of the lead-acid battery grids, lack of complete filling of the drum mold grooves with molten lead and thus undersized grid wires and cold welded seams or junctions of the lug with adjacent wires of the cast lead-acid grid (knitted or cold weld joints) as distinguished from a homogeneously fused joint of the lug with the adjacent wire portions of the cast grid. These knitted or cold formed joints produce lead-acid battery grids with both poor structural quality and a significantly reduced current carrying capacity of the grid.

A variety of different types of batteries have electrodes of a carbon fiber material connected to a lead conductor. There is a need for a way to cost effectively mass produce electrodes of a carbon fiber material attached to a lead conductor.

SUMMARY

In an embodiment, a process of making a composite battery electrode may have a multitude of steps. One step may involve providing a longitudinally elongate strip of an electrically conductive carbon fiber material. Another step may involve continuous casting an electrically conductive metal ribbon along and attached to a longitudinally elongate edge of the strip of carbon fiber material via a casting shoe. And another step may involve severing the strip of carbon fiber material with the attached ribbon into a plurality of electrodes each with a portion of the strip of carbon fiber material with a portion of the ribbon attached thereto.

BRIEF DESCRIPTION OF THE DRAWINGS

The following detailed description of certain embodiments and best mode will be set forth with reference to the accompanying drawings, in which:

FIG. 25 is a front view of a shoe for use with the casting drum of FIG. 19;

FIG. 26 is an end view of the shoe of FIG. 25;

FIG. 46 is an enlarged fragmentary sectional view taken on line 46-46 of FIG. 45;

FIG. 47 is an enlarged view of portion in the circle 47 of FIG. 46;

FIG. 48 is an enlarged fragmentary sectional view taken on line 48-48 of FIG. 45; and FIG. 49 is an enlarged view of the portion in the circle 49 of FIG. 48.

DETAILED DESCRIPTION

Figure 1:
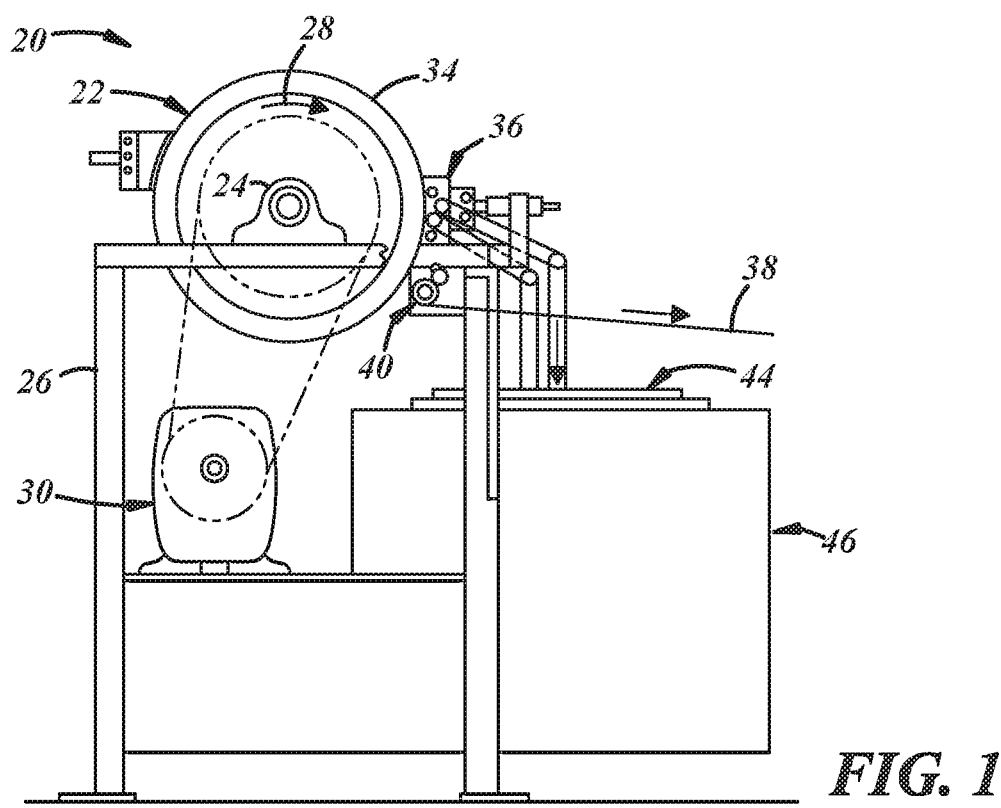
FIG. 1 is a side elevational view of a machine for continuous casting battery grids.
Figure 2:
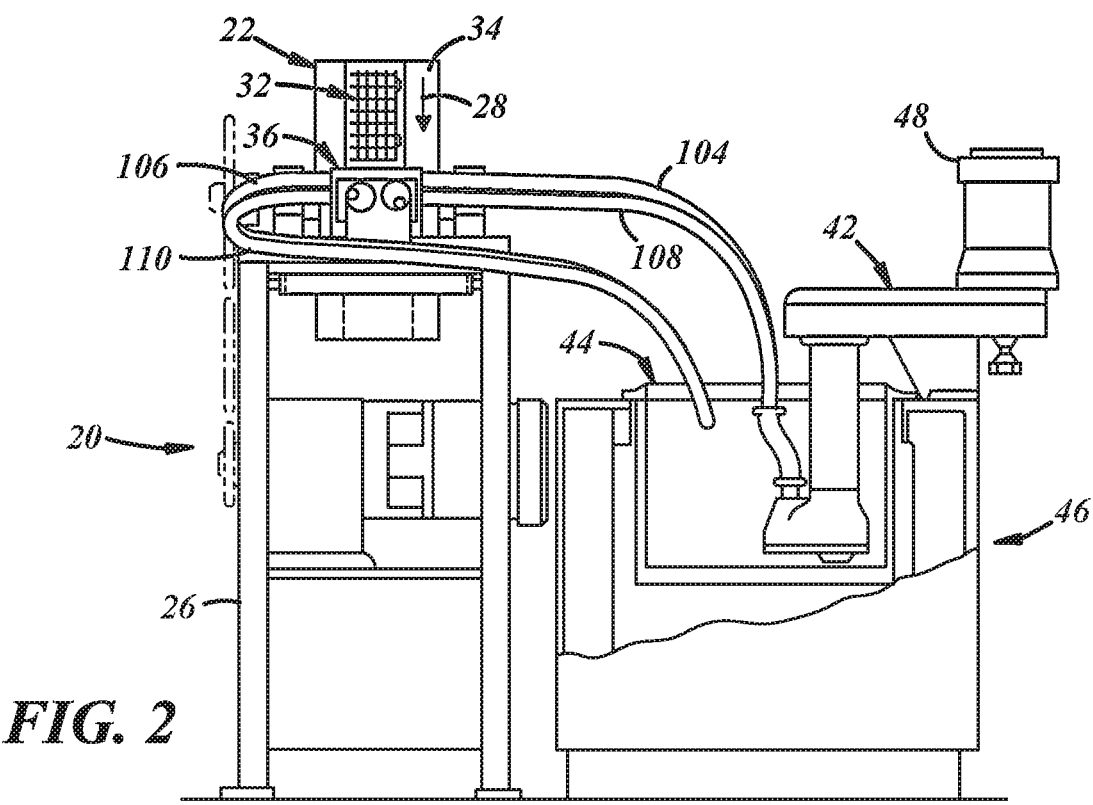
FIG. 2 is an end view of the continuous casting machine of FIG. 1.

In the drawings, FIGS. 1 and 2 illustrate a battery grid continuous casting machine 20 with a battery grid casting drum 22 journaled for rotation in a bearing assembly 24 carried by a frame 26. In use the drum 22 is driven for rotation in the direction indicated by arrow 28 in FIG. 1 by an electric motor 30 which may be a variable speed electric motor. A mold cavity 32 with a desired predetermined battery grid pattern is machined in an outer peripheral cylindrical surface 34 of the drum. Typically, the mold cavity may have a whole number of a plurality of the predetermined desired grid pattern in the cylindrical surface 34 of the drum. In use molten lead may be supplied through a shoe 36 into a confronting portion of the mold cavity 32 of the rotating drum to form a continuous strip or web 38 (FIG. 3) of connected battery grids which are removed from the drum downstream of the shoe such as by passing around a roller 40 downstream of the shoe.

Molten lead at a super atmospheric pressure may be supplied to the shoe 36 by a pump 42 from a lead melting pot 44 of a furnace 46. The pump may be driven by a variable speed electric motor 48 the speed of which may be varied and controlled to select, vary as needed and control the super atmospheric pressure and/or flow rate at which molten lead is supplied to the shoe. Excess molten lead may be returned from the shoe to the lead pot 44.

Figure 3:
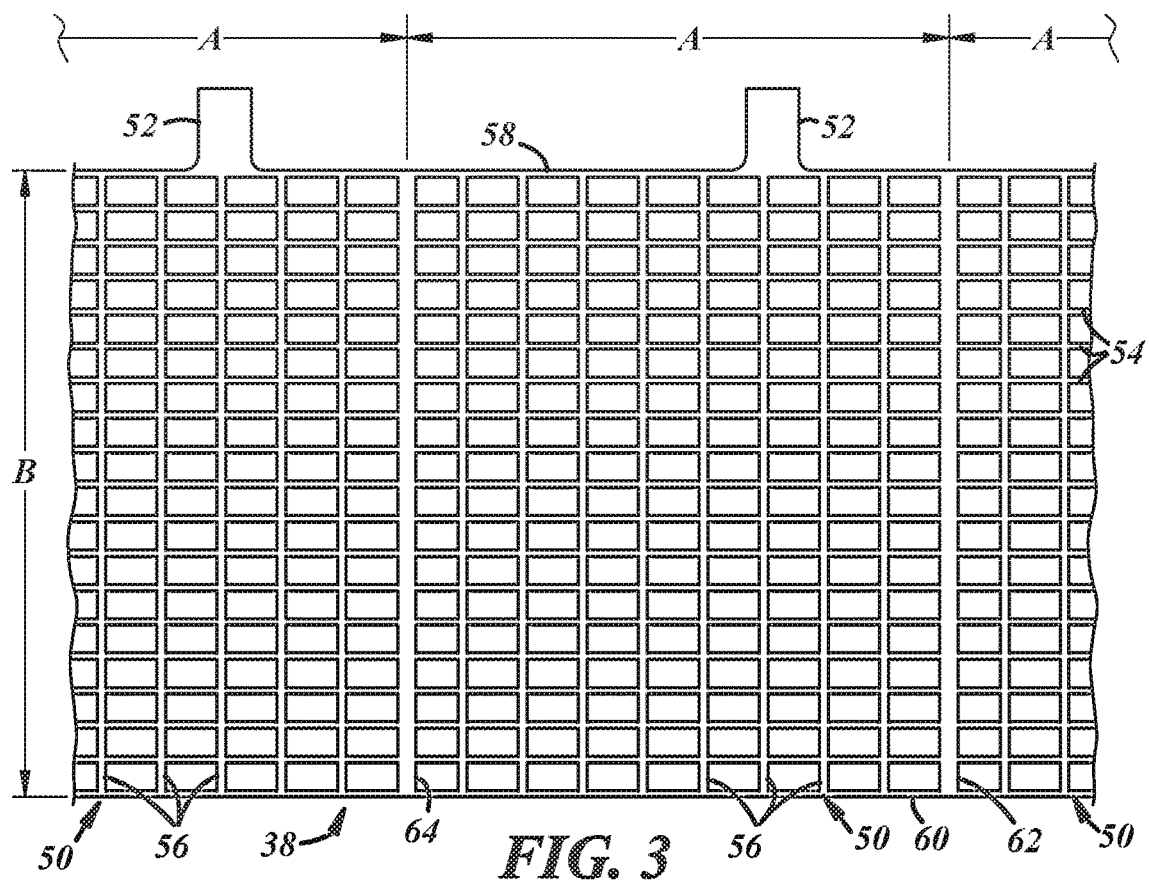
FIG. 3 is a fragmentary plan view of a strip or web of continuous cast battery grids.
Figure 4:
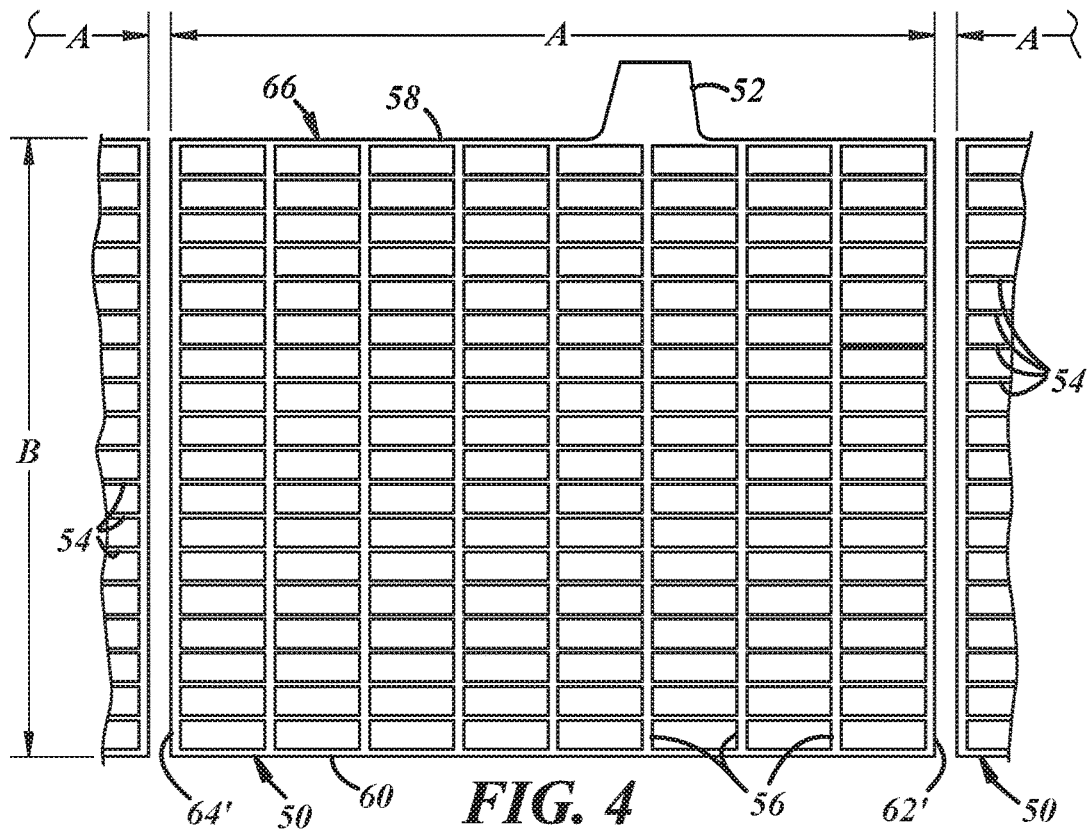
FIG. 4 is a fragmentary plan view of the separation of individual battery grids from the continuous web of FIG. 3.

As shown in FIG. 3, the cast web 38 may have a plurality of connected battery grids 50 typically of the same longitudinal web length A and web transverse width B and each with a connector lug 52. As shown in FIG. 4, the web may be separated into separate individual grids 50. The web and thus each grid 50 may have generally longitudinally extending and laterally spaced apart grid wires 54 and generally laterally or transversally extending and longitudinally spaced apart grid wires 56. The web and thus each grid 50 may include longitudinally extending wires 58 and 60 which in an individual grid may be top and bottom frame wires respectively and laterally or transversely extending wires 62 and 64 which in an individual grid may be end or side frame wires. In the web the lateral wires 62 and 64 may have a longitudinal width at least twice that of the intermediate lateral wires 56 so that when severed and separated into individual grids the end wires 62 and 64 may desirably have a width equal to or greater than the immediate lateral wires 56. The top and bottom longitudinal wires 58 and 60 may have a greater width and/or depth than the intermediate longitudinal wires 54. A peripheral frame 66 of each grid formed by the interconnected wires 58, 60, 62', and 64' may provide each grid with sufficient structural strength to be readily further processed and assembled into a battery.

As shown in FIG. 2, the mold cavity 32 in the drum may have circumferentially continuous and axially spaced apart grooves in its cylindrical peripheral surface which form the cast longitudinal wires 54, 58, and 60 of the web 38 and after severing the individual longitudinal wires of the individual grid 50. The mold cavity 32 may also have generally axially extending and circumferentially spaced apart grooves in its cylindrical surface which form the lateral wires 56, 62, and 64 of the cast web and after severing of each individual grid 50. The mold cavity 32 in the cylindrical surface of the drum will also have an appropriate recess for casting a lug 52 as part of each grid 50 of the web of continuous grids. Typically, each grid of the as cast web 38 will have essentially the same longitudinal length A and transverse width B and after separation from the web each individual grid will have substantially the same length A and width B.

Skilled persons understand and know that the intermediate lateral wires 56 may be arranged in other patterns in which they are not substantially perpendicular to the longitudinal wires 54 and the intermediate lateral wires 56 may extend at an angle with respect to the bottom and top wires 58 and 60 and may be inclined to extend toward the lug 52.

Skilled persons know how to design and construct a variety of continuous casting machines and drums with a suitable mold cavity for continuously casting a web of a wide variety of a plurality of connected grids and thus the construction of machine 20, rotary drum 22, and furnace 46 will not be further described herein. One continuous casting machine is disclosed in U.S. Pat. No. 4,509,581 which is incorporated herein in its entirety by reference.

Figure 5:
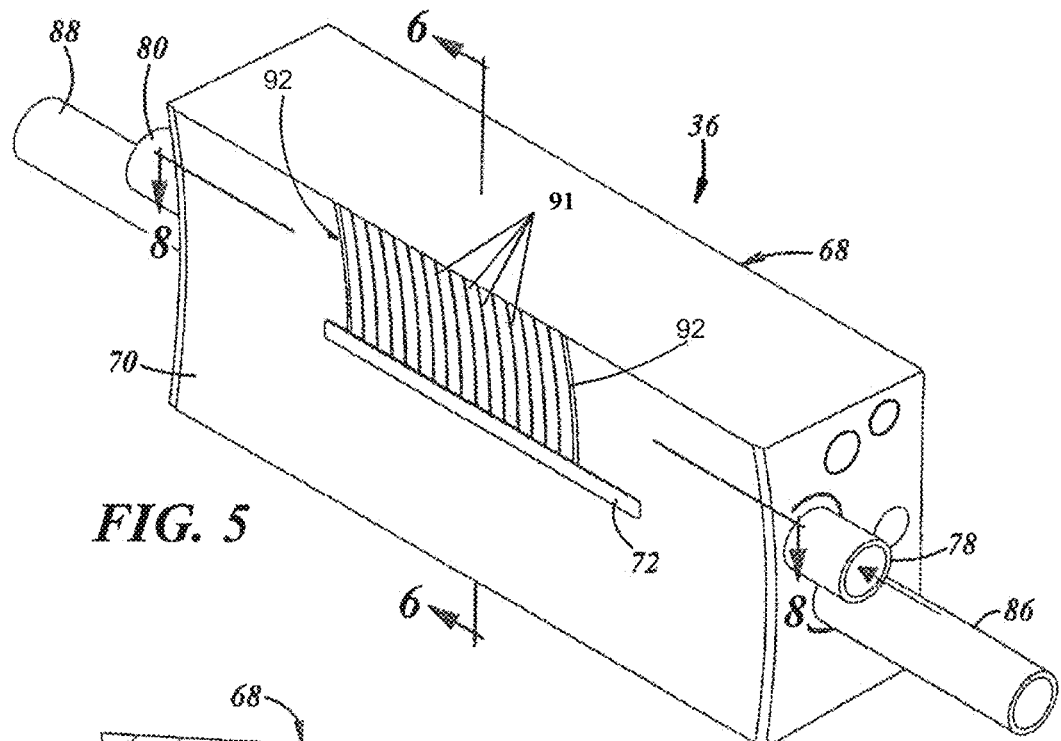
FIG. 5 is a perspective view of one form of a continuous casting shoe which may be used in the machine of FIG. 1.
Figure 6:
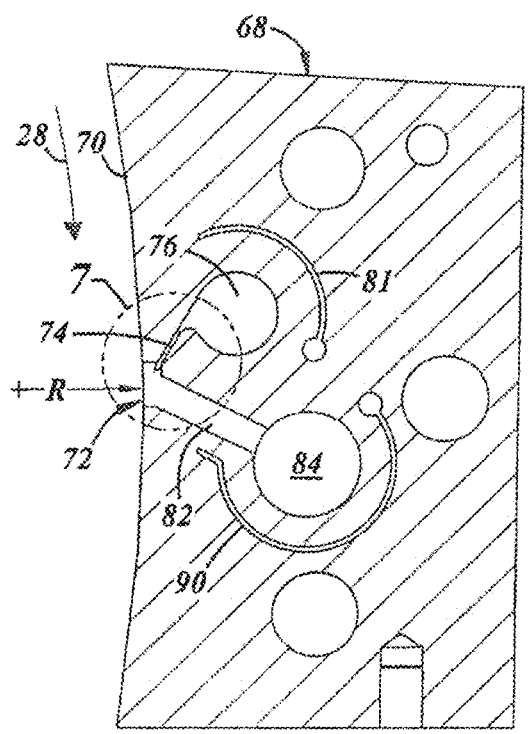
FIG. 6 is an enlarged sectional view taken on line 6-6 of FIG. 5.
Figure 7:
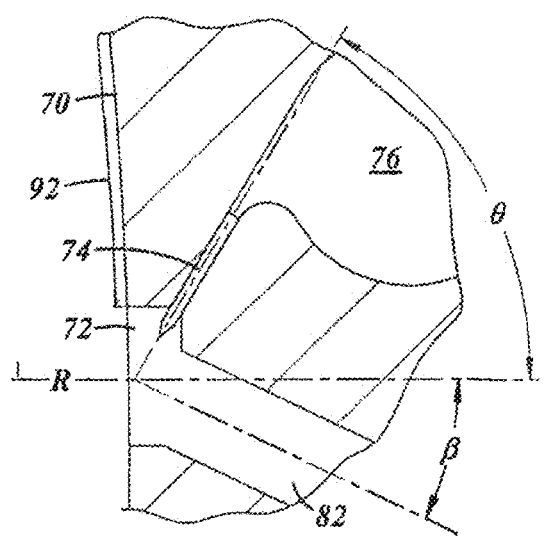
FIG. 7 is an enlarged fragmentary view of the portion of FIG. 6 in the circle 7.

FIG. 5 illustrates the shoe 36 for dispensing molten lead into a mold cavity 32 of a rotating drum 22 for continuously casting a web 38 of a plurality of connected grids. As shown in FIGS. 5 and 6 this shoe may have a body 68 with a generally arcuate front face 70 with an axially elongate orifice slot 72 therein which may confront a rotating drum (such as drum 22) and may extend axially or longitudinally generally parallel to the axis of rotation 28 of the drum. The longitudinal length of the orifice slot 72 may extend across the entire axial width of the mold cavity 32 including the lug portion of the mold cavity. In use, excess molten lead may be supplied to the orifice slot 72 through a longitudinally extending supply slot 74 (FIGS. 6 & 7) which may open into an upper recessed portion of the orifice slot 72 and may extend longitudinally substantially the whole longitudinal length of the orifice slot. Desirably the supply slot 74 is inclined downwardly toward the face 70 generally in the direction of rotation 28 of the drum past the orifice slot 72 to facilitate flow of both molten lead into the portion of the mold cavity passing the slot and the return of excess molten lead from the orifice slot. As shown in FIG. 7, the supply slot 74 may be inclined downwardly (generally in the direction of rotation of the drum) at an acute included angle Ø relative to a radius R of the drum extended through the arcuate center of the orifice slot 72 in the range of about 50° to 70°, desirably 55° to 65° and preferably about 60°.

As shown in FIGS. 6 and 7, the upstream end of this supply slot 74 opens into a molten lead supply passage 76 which may extend axially throughout the length of the shoe body 68 and communicate with an inlet connector 78 at one end of the body and an outlet connector 80 at the other end of the body. Generally, radially outward of the supply passage 76, an arcuate isolator slot 81 may extend generally axially throughout the body to decrease the thermal transfer of heat from molten lead in the supply passage to the body of the shoe.

In use, more molten lead is supplied through the supply slot 74 to the orifice slot 72 then is dispensed into the mold cavity 32 of the rotating drum and the excess molten lead is returned from the orifice slot through a return slot 82 which communicates with the orifice slot downstream of the supply slot 74 and is inclined downwardly away from the orifice slot 72 relative generally to the direction of rotation of the drum. As shown in FIG. 7 the return slot 82 may be inclined downwardly away from the orifice slot 72 at an acute included angle ß relative to an extension of the radius R of the drum through the arcuate center of the orifice slot 72 that may be in the range 20° to 40°, desirably 25° to 35° and preferably about 30°. This return slot is longitudinally elongate and desirably may extend the entire longitudinal length of the recess of the orifice slot 72. The minimum cross sectional area of the return slot 82 may be on the order of four to ten times greater than the minimum cross sectional area of the supply slot 72, desirably six to eight times greater than that of the supply slot, and preferably about seven times greater than that of the supply slot.

The downstream end of the return slot 82 may communicate with and open into a return passage 84 extending generally axially through the body 68 of the shoe 36 and communicating at one end with a molten lead inlet connector 86 and at the other end with a molten lead outlet connector 88. An arcuate isolator slot 90 generally radially outward of the return passage may extend through the body 68 of the shoe to reduce heat transfer from molten lead in the return passage and the return slot to the shoe body.

Figure 8:
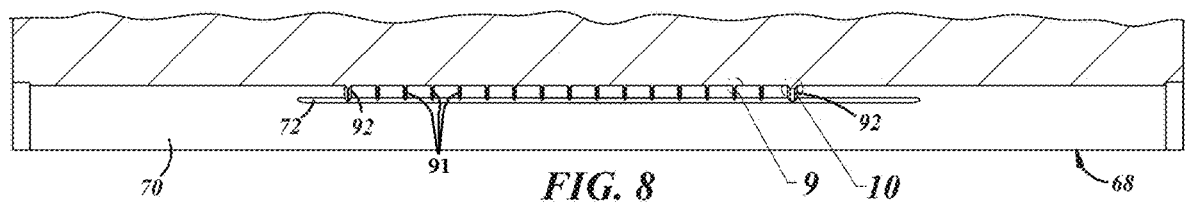
FIG. 8 is an enlarged fragmentary sectional view taken on line 8-8 of FIG. 5.
Figure 9:
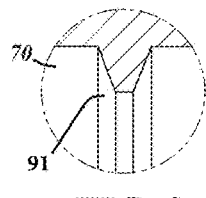
FIG. 9 is an enlarged fragmentary view of the portion of FIG. 8 in the circle 9.
Figure 10:
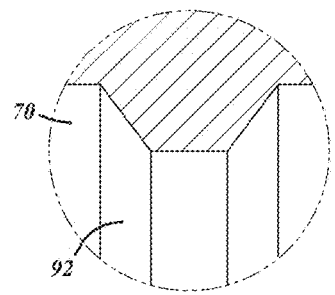
FIG. 10 is an enlarged fragmentary view of the portion of FIG. 8 in the circle 10.

When casting a continuous web of battery grids, molten lead dispensed from the orifice slot 72 into the circumferential grooves of the drum mold cavity 32 tends to flow upstream counter to the direction of rotation of the drum. Therefore, to inhibit this upstream flow, as shown in FIGS. 5 and 8 the shoe 36 has a series of axially spaced apart ribs 91 & 92 extending circumferentially upstream from the upper edge of the orifice slot and projecting radially outwardly from the arcuate face 70 of the shoe with each rib in cross section configured to be closely received in an associated circumferential groove of the mold cavity 32 in which one of the longitudinal grid wires is cast. As shown in FIG. 9, the ribs 91 received in the cavity grooves in which the intermediate longitudinal wires 54 are cast may be smaller in or otherwise have a different cross sectional area than that of the ribs 92 (FIG. 10) received in the circumferential grooves in the mold cavity in which the top and bottom longitudinal wires 58, 60 of the grid are cast. Typically, a top wire 58 of a grid and its associated rib 92 may have a larger cross sectional area than that of a bottom wire 60 and its associated rib. The exterior surfaces of each rib 91, 92 may be designed and constructed to have a slight clearance with the corresponding surface of its associated groove of the mold cavity 32 of about 0.000 to 0.003 thousands of an inch.

As shown in FIG. 5, the orifice slot 72 and the associated portions of the supply and return passages or slots 74, 82 extend generally axially or longitudinally significantly beyond or outboard of the mold cavity 32 groove forming the top frame wires 58 to extend across and desirably slightly beyond the axial extent of the recesses of the mold cavity forming the lug 52 of the battery grids of the continuous web. It has been empirically determined that the construction, arrangement and orientation of the orifice slot 72, and supply and return slots 74, 82 improves the casting and integrity of each lug 52 and the homogeneity of its merging into and attachment with the associated frame wire 58 of the cast grids and significantly decreases if not essentially eliminates any cold welding and seams between them. This is believed to be due to significantly less upfill or upflow of molten lead relative to the direction of rotation the drum as the initial portion of the mold cavity recess forming the cast lug 52 moves downwardly into registration with this portion of the orifice slot 72 and the molten lead entering this recess remains in a molten condition for a sufficient period of time to result in a flowing together and homogeneous casting of the lug with the adjoining frame wire as this wire is being cast and solidifies throughout the longitudinal and lateral extent of the attachment and merging of the lug into this frame wire. Regardless of any theoretical explanation, it has been empirically determined that improvement of this cast lug and lug wire interface occurs even though the temperature of the molten lead supplied to the shoe is at a lower temperature than that of prior art shoes.

The minimum cross sectional flow area of the orifice slot 72 through the confronting face is significantly greater than the minimum cross sectional flow area of the supply slot 74 and in some implementations may be in the ratio or range of 8:1 to 15:1 and desirably in the ratio range of 9:1 to 11:1. In one practical implementation the orifice slot has a width of 0.270 of an inch, the supply slot has a width of 0.025 of an inch and each has a longitudinal length of 4.787 inches. In at least some implementations, a minimum cross sectional flow area of the orifice slot 72 may be substantially equal to or greater than the minimum cross sectional flow area of the return slot 82 and may be in the ratio or range of 1:1 to 3:1 and desirably in the ratio or range of 1:1 to 2:1. In one practical implementation the orifice slot 72 has a width of 0.270 of an inch, the return slot 82 has a width of 0.180 of an inch and each has a longitudinal length of 4.787 inches. In at least some implementations, the minimum cross sectional flow area of the return slot 82 is substantially greater than the minimum cross sectional flow area of the supply slot 74 and may be in the ratio or range of 5:1 to 10:1 and desirably 6:1 to 9:1. In one practical implementation the return slot 82 has a width of 0.180 of an inch, the supply slot has a width of 0.025 of an inch and each has a longitudinal length of 4.787 inches. In at least some implementations a shoe may be used in a continuous casting machine to produce a web of a plurality of continuously cast grids each having for example a longitudinal length A of 5.8 inches and a nominal transverse width B of 5.2 inches, a thickness of 0.04 of an inch, and weighing about 1.5 ounces of a lead alloy.

The orifice slot 72 and associated separate supply and return slots 74 & 82 extending longitudinally or axially across the mold cavity 32 of the drum has the significant practical advantages of providing longer periods of continuous casting of webs of connected battery grids without having to clean out and remove dross, solidified lead particles and other contaminants from the shoe, the ability to continuously cast webs at a lower molten lead temperature and lower shoe temperature, a significantly increased maximum production rate, improved grain structure of the lead of the cast grids, significantly improved lug structure and integrity of the cast grids, improved control of the continuous casting process, and improved castability of lead alloys particularly lead alloys commonly used in lead acid battery grids including lead antimony alloys. As used in this description and the claims, the terms lead, molten lead and cast lead include without limitation both essentially pure metallic lead and a wide variety of lead alloys including without limitation lead alloys with one or more of calcium, antimony, selenium, copper, tin, aluminum, silver, arsenic, barium, bismuth, etcetera.

Figure 14:
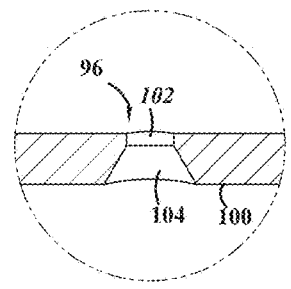
FIG. 14 is an enlarged fragmentary view of the portion of FIG. 13 in the circle 14.
Figure 11:
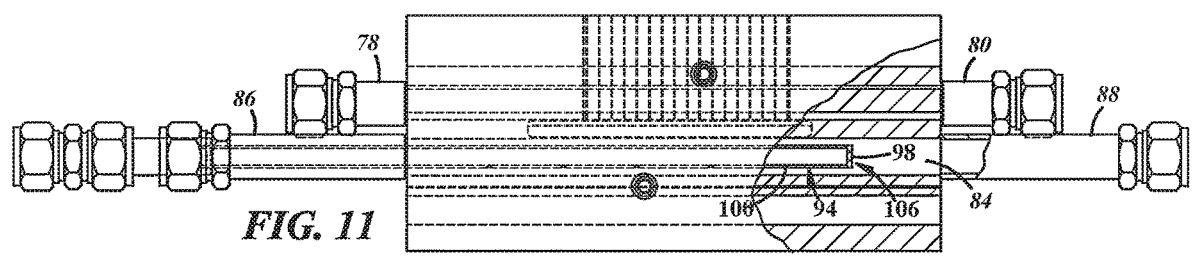
FIG. 11 is a back view of the shoe of FIG. 5 with a portion broken away and in section to illustrate an optional return passage molten lead return tube in the shoe.
Figure 12:
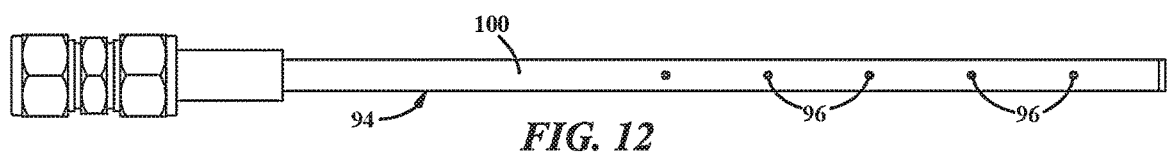
FIG. 12 is a side view of the return tube.
Figure 13:
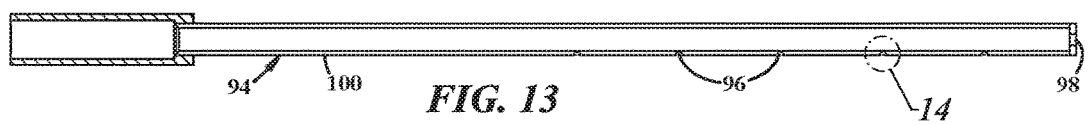
FIG. 13 is a sectional view of the return tube.

FIG. 11 illustrates an optional addition to the shoe 36 of a return passage molten lead return tube 94 which improves the return of excess lead from the orifice slot 72 through the return slot 82. In use, molten lead is supplied to the return passage 84 through this return tube which when received in the return passage may dispense molten lead through both a series of longitudinally spaced apart holes or apertures 96 through its side wall as shown in FIGS. 11-13 and/or through a restricted orifice 98 in the downstream end of the tube. As shown in FIG. 14, the holes 96 in the side wall 100 of the tube may have a cylindrical bore 102 which merges into a frustoconical opening 104 outwardly through the wall.

The end of the tube 94 with the restricted orifice 98 may be disposed near the outlet end of the return passage 84 and in use is believed to provide a nozzle which with the return passage 84 forms an eductor or jet pump 106 which decreases the pressure of the molten lead in the orifice slot and increases the flow rate at which excess molten lead may be removed from the recess of the orifice slot 72 through the return slot 82. Regardless of any theoretical explanation, the use of this return tube improves the casting of the lugs 52 and the adjoining portion of the wires 58 and permits a higher flow rate of excess molten lead through the shoe which is believed to permit the supply of molten lead to the orifice slot 72 at a lower temperature and thus molten lead in the mold cavity 32 solidifies in less time which enables a higher or faster production rate of cast webs of continuous grids. In some applications this may permit molten lead to be supplied to the supply passage 76 at a temperature in the range of 50° C. to 80° C. above the solidification temperature of the lead and enable the maximum production rate of cast webs to be increased by 30% to 50% greater than that achieved with prior art shoes of continuous casting machines. This also improves the integrity of the cast lug 52 and the metallurgical grain structure of the cast grids.

In use of the shoe 36 in a continuous casting machine it is desirable to be able to supply molten lead at different pressures and different flow rates to the supply passage 76 and the separate return passage 84. One way in which this may be readily achieved is to use separate molten lead pumps 42 in a common furnace 46 or separate furnaces with separate pumps to supply molten lead to each of these passages. For example, the outlet of a first pump 42 may be connected by a suitable conduit 104 to the inlet 78 of the supply passage 76 and the outlet 80 of the supply passage may be connected by a suitable conduit 106 to return excess molten lead to the melting pot 42 of the furnace 46. A second pump (not shown) of either the same or a separate furnace may be connected by a suitable conduit 108 to the inlet 86 of the separate return passage 84 and molten lead flowing through the outlet 88 of this passage may be returned by a suitable conduit 110 to a melting pot 44 of either the same or a second furnace. If each pump is driven by a separate variable speed electric motor 30 the flow rate and pressure of the molten lead supplied to each of the supply passage 76 and return passage 84 may be readily varied and controlled as desired to optimize the production rate and the quality of the battery grids 50 of a continuously cast web produced by the casting machine in which the shoe 36 is utilized.

Figure 15:
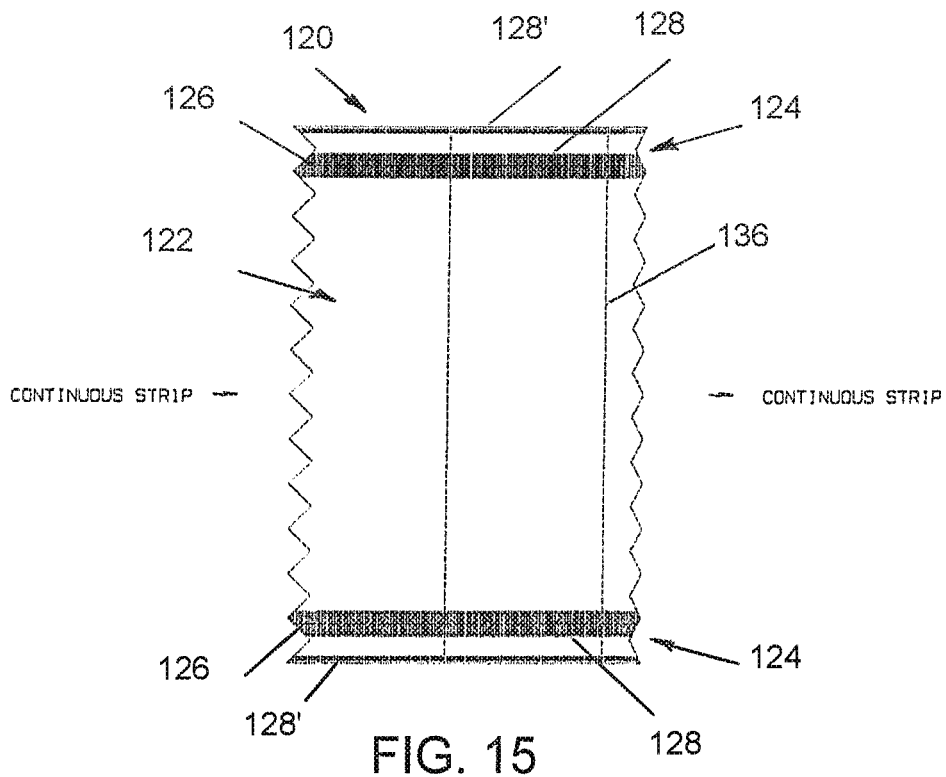
FIG. 15 is a fragmentary plan view of a longitudinally elongate composite strip of a carbon fiber material with a lead conductor ribbon attached along each elongate edge of the strip of carbon fiber material.
Figure 16:
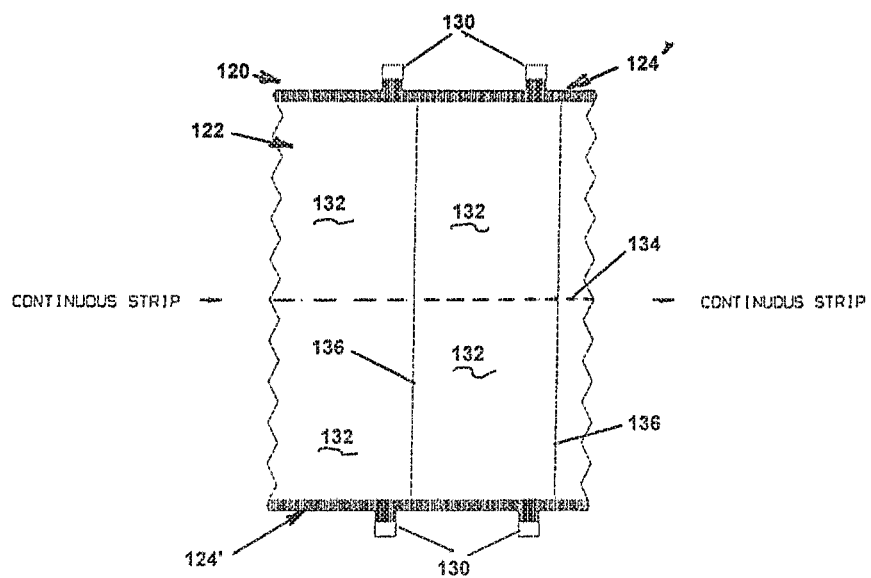
FIG. 16 is a fragmentary plan view of the longitudinally elongate composite strip of FIG. 15 with lugs of each lead conductor ribbon.

FIG. 15 illustrates a longitudinally elongate composite web or strip 120 of electrically conductive carbon fiber material 122 with a longitudinally elongate electrically conductive cast lead or lead alloy ribbon 124 (hereinafter lead ribbon) attached to each longitudinal edge 126 of the carbon fiber material. Each lead ribbon may have retainers desirably in the form of uniformly longitudinally spaced apart and transversely extending ribs 128 and 128' in each lead ribbon formed when casting the lead ribbon 124 to the carbon fiber material 122. During casting and solidification, the ribs resist movement of the ribbon 124 relative to the drum due to friction with the shoe and may provide locators for subsequent operations such as severing the strip 120 into individual electrodes. FIG. 16 illustrates the elongate composite strip 120 in which each lead ribbon 124' includes equally longitudinally spaced apart lugs 130 which may be formed either when casting the lead ribbons or by stamping, punching, severing or otherwise cutting away portions of each cast ribbon 124 to form the lugs thereof. To form individual electrodes 132 of carbon fiber material with a lead ribbon attached along one edge, all forms of the elongate strip 120 may be severed longitudinally as indicated by the broken line 134 and transversely as indicated by broken lines 136. Alternatively, a composite longitudinally elongate strip may be formed with a lead ribbon 124 along only one longitudinal edge of a strip of carbon fiber material 122 and severed transversely (at 136) to form a plurality of individual electrodes 132.

Typically, each lead ribbon may have a nominal thickness in the range of about 0.030 to 0.080 of an inch and a transverse width in the range of about 1.2 to 2.0 inches. The carbon fiber material may have a thickness in the range of about 0.030 to 0.180 of an inch and for automotive batteries a transverse width of about 6 to 12 inches and desirably 8 to 10 inches if lead ribbons will be attached along both longitudinal edges and a transverse width in the range of about 3 to 6 inches if a lead ribbon will be attached along only one longitudinal edge. For stationary batteries the carbon fiber material may have a transverse width in the range of about 6 to 12 inches where a lead ribbon is attached along only one longitudinally elongate edge. Typically, the carbon fiber material may include a variety of electrically conductive carbon or graphite fibers (hereinafter both referred to as carbon fiber material), may be several hundred feet in length and be sufficiently flexible so that it may be coiled into rolls. Suitable elongate strips of carbon fiber material commonly referred to as carbon fiber felt are commercially available.

A suitable method of making carbon fiber electrodes 132 includes casting liquid lead or a liquid lead alloy into an electrically conductive lead ribbon 124 along one or both edges 126 or along a mid portion of a longitudinally elongate strip of carbon fiber material 122 to produce a composite strip 120 or 320 and thereafter severing the carbon fiber material and attached lead ribbon or ribbons to form a plurality of individual electrodes 132. Depending on the desired application and downstream processing of the composite strip 120, each lead ribbon may have ribs 128 and/or lugs 130 cast therein or after casting, lugs 130 subsequently formed by various punching, stamping, cutting, shearing, and/or severing operations which remove portions of the cast lead ribbon 124 to form the lugs of the cast lead ribbon.

Figure 17:
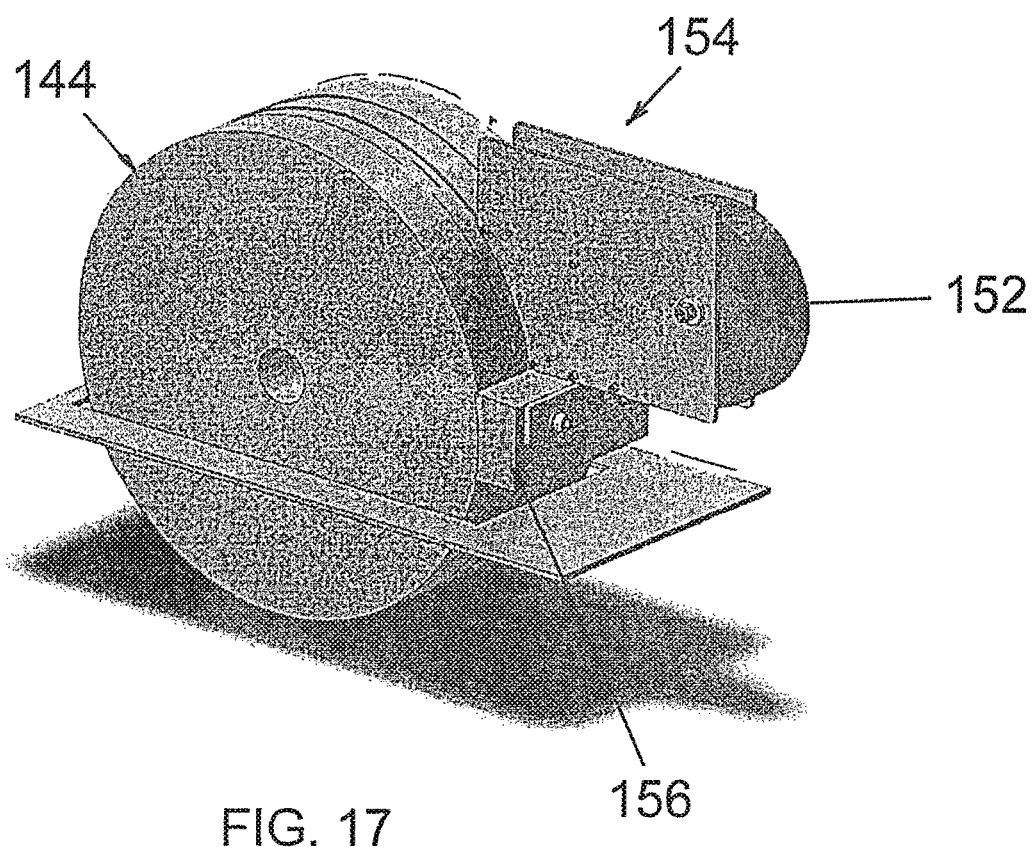
FIG. 17 is a semi-schematic perspective view of a device for unwinding a roll of an elongate strip of carbon fiber material and feeding it onto a drum in the machine of FIGS. 1 & 2.
Figure 18:
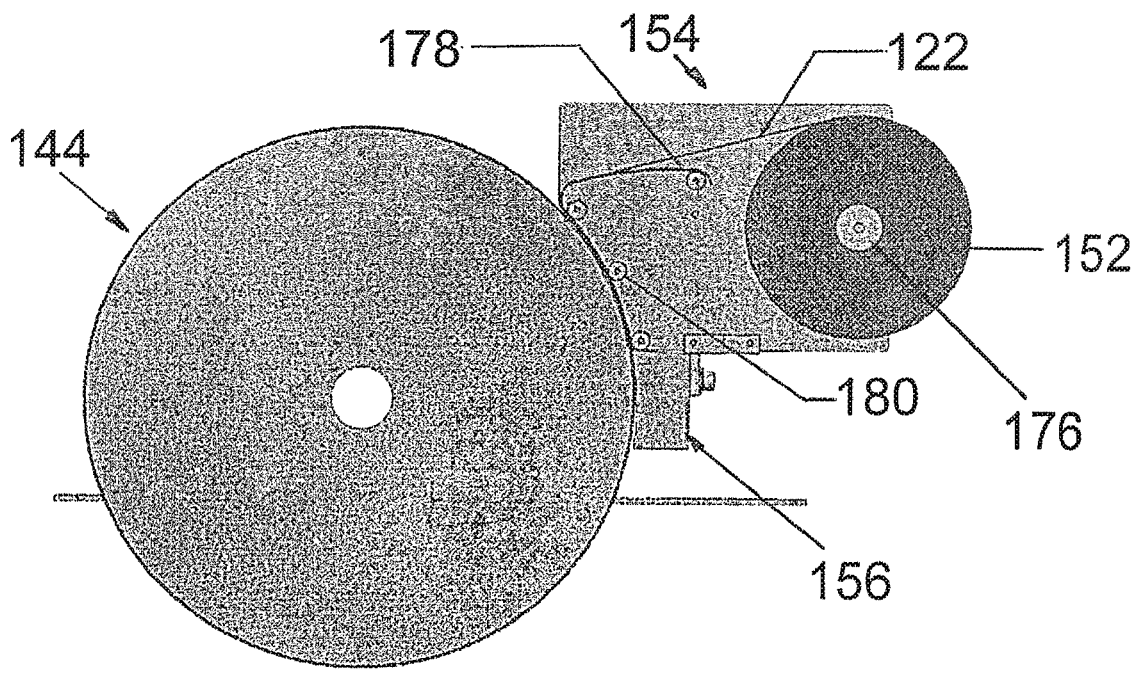
FIG. 18 is a semi-schematic side view with portions broken away of the device of FIG. 17.
Figure 19:
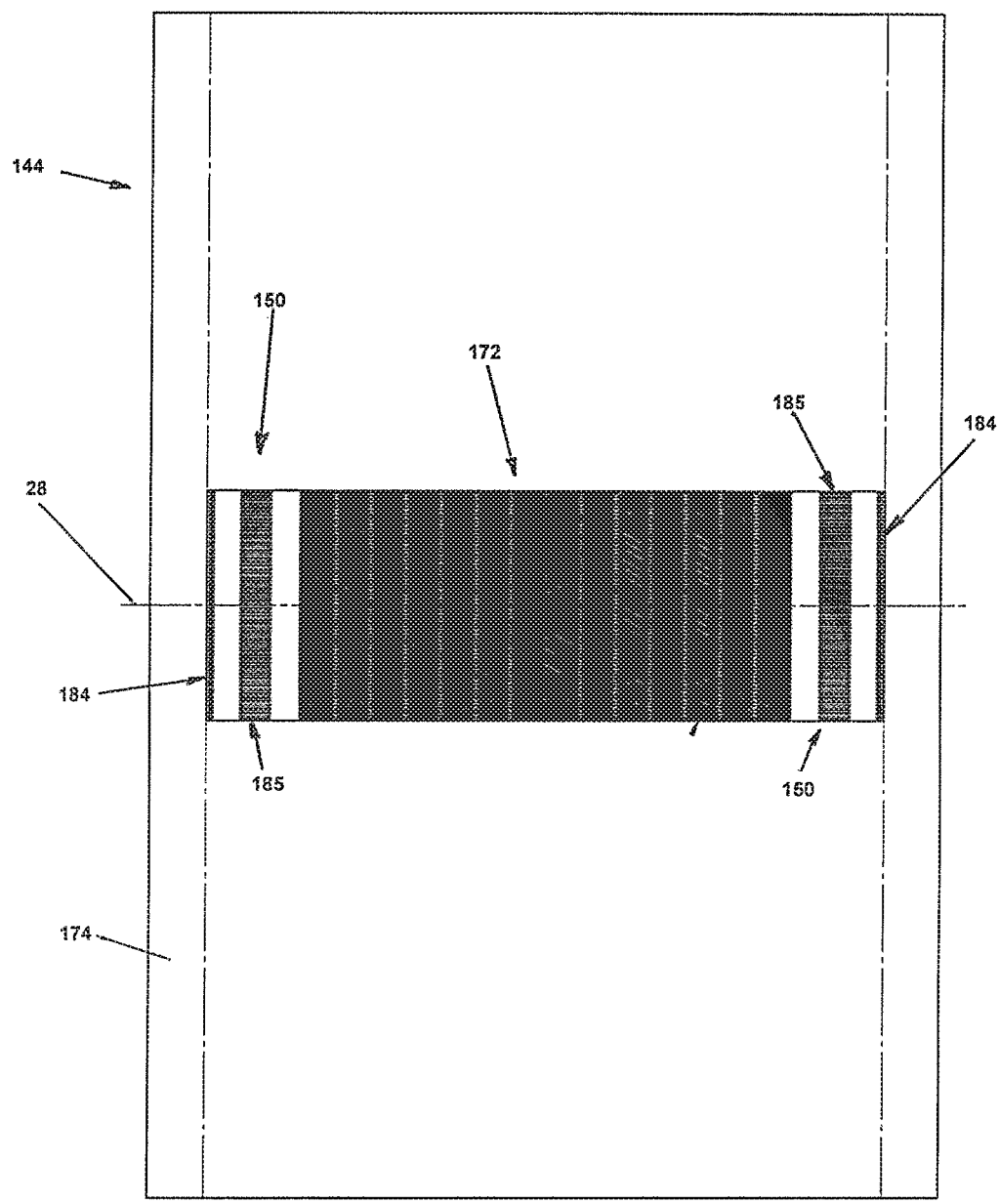
FIG. 19 is a side view of a casting drum including a portion of its cavities for casting the lead conductor ribbons of the composite strip of FIGS. 15 & 16 which may be used with the machine of FIGS. 1 & 2.

A casting drum 144 (FIG. 19) and shoe 156 (FIGS. 25 & 26) may be used with the machine 20 to continuously cast a conductive lead or lead alloy ribbon 124 attached along both edges 126 of a longitudinally elongate strip 120 of carbon fiber material 122. Portions of a longitudinally elongate strip 120 of a carbon fiber material 122 may be received on the rotating casting drum 144 and the drum may have cavities 150 (FIGS. 19-23) for casting continuous lead ribbons 124 attached to one or both longitudinally extending edges of the carbon fiber strip of material. As shown in FIGS. 17 and 18, a roll 152 of the carbon fiber material may be unwound and disposed on the rotating drum 144 by an uncoiling device 154. In operation of the machine 20, liquid lead is supplied through the shoe 156 to a proportion of the cavities 150 to cast and attach the lead ribbons 124 along both longitudinal edge portions of the carbon fiber strip 120 of material. Liquid lead under pressure may be supplied to the shoe from the lead pot 44 of the melting furnace 46 by the pump 42. Typically, the liquid lead may be supplied to the shoe 156 by the pump at a super-atmospheric pressure and a temperature in the range of about 700 to 1,100 degrees F. The drum 144 may be at an average temperature usually in the range of about 200° F. to 400° F. The composite strip 120 of carbon fiber material with lead ribbons 124 attached thereto is removed from the drum as a longitudinally elongate continuous composite strip 120 which may thereafter be severed into individual electrodes 132.

Figure 20:
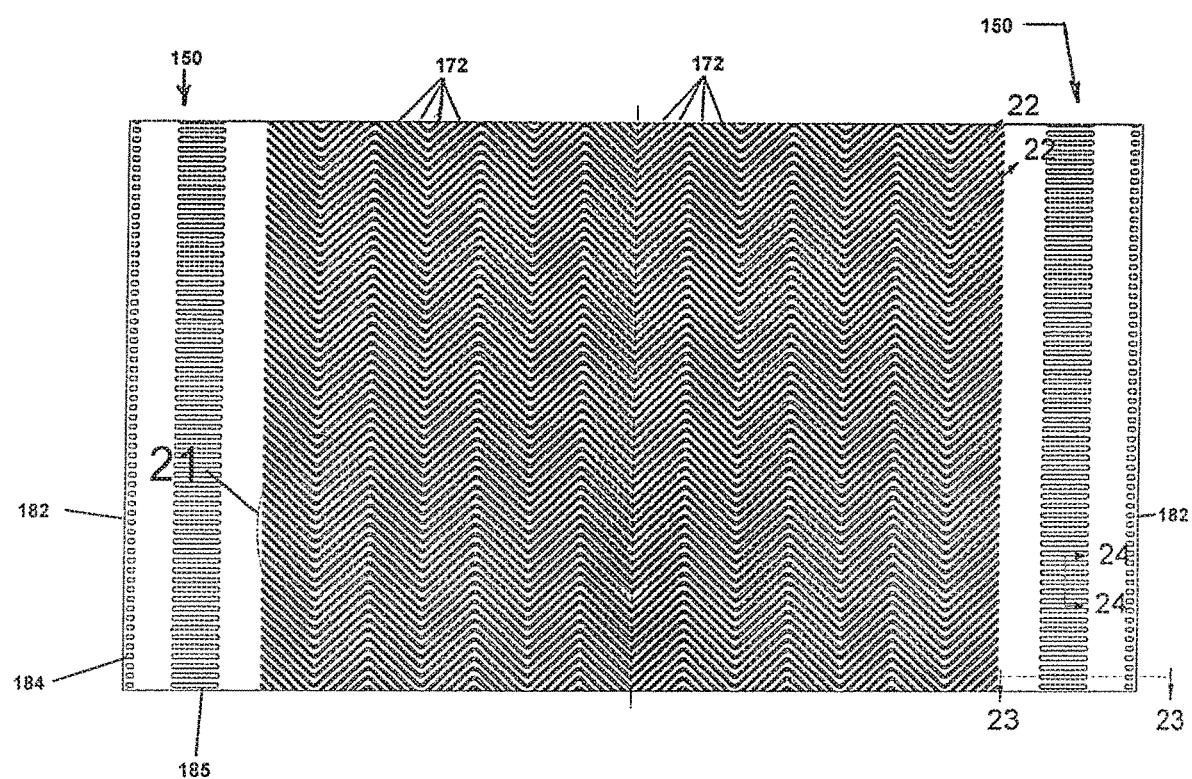
FIG. 20 is an enlarged view of a portion of the periphery of the casting drum of FIG. 19.
Figure 22:
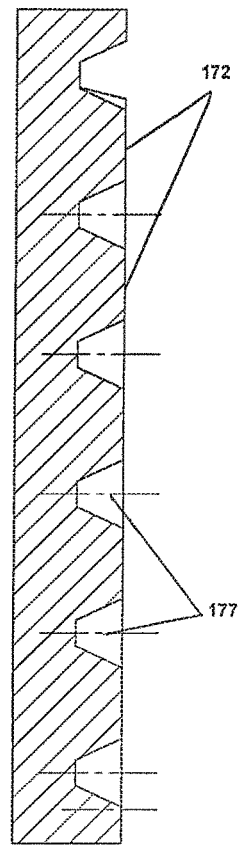
FIG. 22 is an enlarged fragmentary sectional view taken on line 22-22 of FIG. 20.
Figure 21:
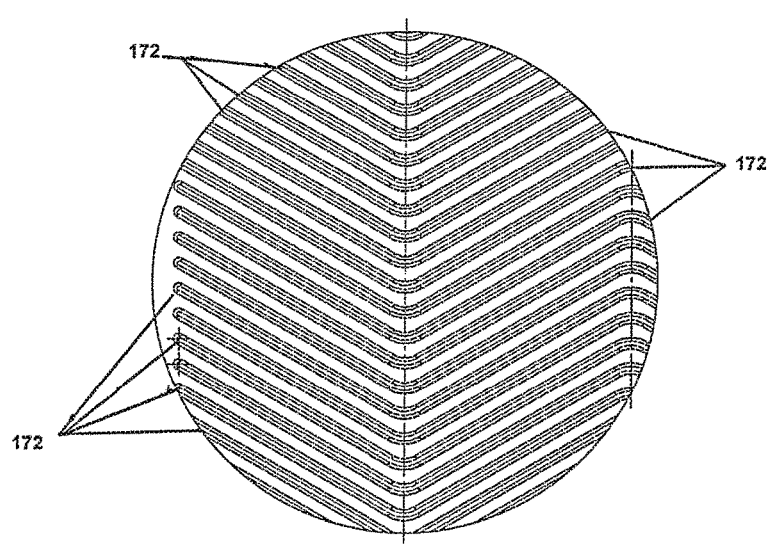
FIG. 21 is an enlarged view of the portion in the circle 21 of FIG. 20.

For retaining a portion of the carbon fiber strip 122 of material on the drum 144 while the lead ribbons 124 are cast thereon, as shown in FIGS. 20-22, a plurality of circumferentially spaced apart lands 172 arranged in a zig zag pattern are disposed circumferentially continuously around a peripheral surface 174 of the drum. As shown in FIG. 22, the lands may have a face width of about 0.03 of an inch, a depth of about 0.02 of an inch, be spaced apart about 0.03 of an inch, and may be inclined at an acute included angle of about 30° to the axis of rotation 28 of the drum. The lands may be formed by grooves 177 in the peripheral surface 174 of the drum. The groove side walls may be inclined at about 25° with a width of about 0.03 of an inch at the peripheral surface 174 of the drum. In operation of the machine 20, these lands bear on and in cooperation with the shoe slightly compress the strip of carbon fiber so that it does not move relative to the drum while the lead ribbons 124 are cast thereon. As shown schematically in FIGS. 17 & 18 the unwinding device 154 disposes succeeding portions of the carbon fiber strip 122 onto the rotating drum 144 and into engagement with the lands 172. This unwinding device 154 may include an arbor 176 on which a roll 152 of the strip 122 of carbon fiber material may be rotatably received, a guide band 178 for directing portions of the strip as it is unrolled onto the rotating drum, and rollers 180 for guiding the strip onto the lands 172 as it passes between the rollers and the rotating drum. Desirably the rollers 180 extend transversely across the entire width of the strip 122 and are journaled to freely rotate in response to rotation of the drum 144 and the advancement of the carbon fiber strip 122 onto the drum. Of course, persons of ordinary skill may readily devise other devices for applying successive portions for a strip 122 of a carbon fiber material onto the rotating drum 144 and into engagement with the lands 172.

Figure 29:
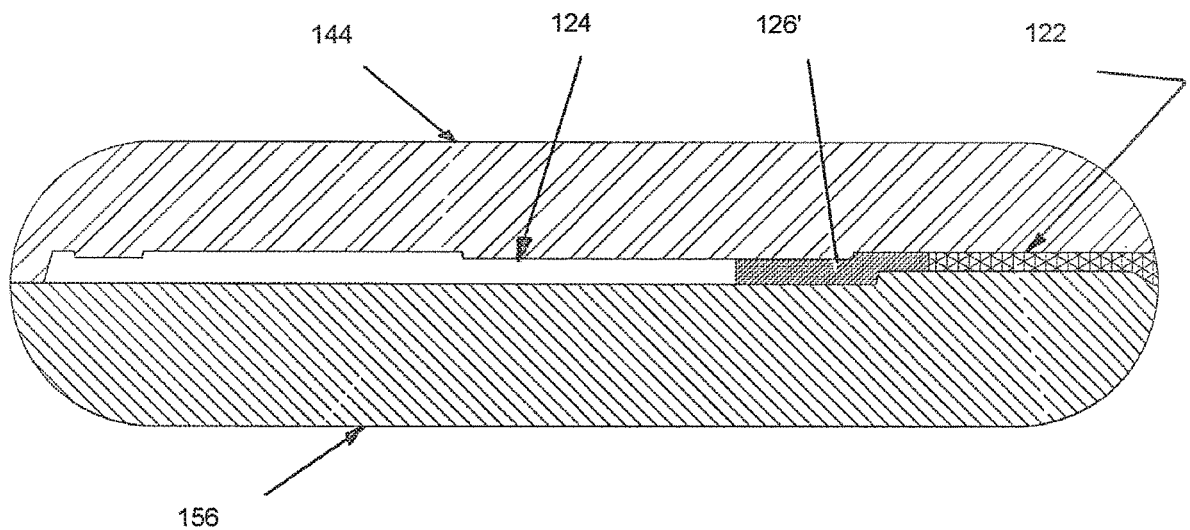
FIG. 29 is an enlarged view of the portion in the circle 29 of FIG. 28.

For casting each lead ribbon 124, the drum 144 may have a separate cavity 150 (FIG. 20) recessed in and extending circumferentially continuously around the peripheral surface of the drum. For making the composite strip 120 with a cast lead ribbon 124 attached to each longitudinal edge 126 of a carbon fiber strip, two separate cavities 150 may be provided each adjacent to and in use somewhat underlapping one of the longitudinal edges 126 of the strip 122 of carbon fiber. Each cavity underlaps and may also overlap an adjacent edge portion 126 of the carbon fiber material and desirably has a circumferentially continuous land 182 which limits the generally axial extent to which liquid lead flows generally axially outward of the cavity. As shown in FIGS. 15 & 29, to at least some extent, the liquid lead penetrates into an edge portion 126' of the carbon fiber material extending into the cavity and when solidified attaches or secures the lead ribbon to the carbon fiber materials and provides an electrically conductive path or conductor for the carbon fiber material. In some instances the liquid lead may saturate at least part of the edge portion of the carbon fiber material.

Figure 24:
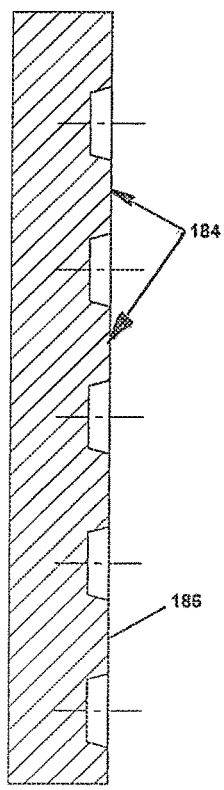
FIG. 24 is an enlarged fragmentary sectional view taken on line 24-24 of FIG. 20.
Figure 23:
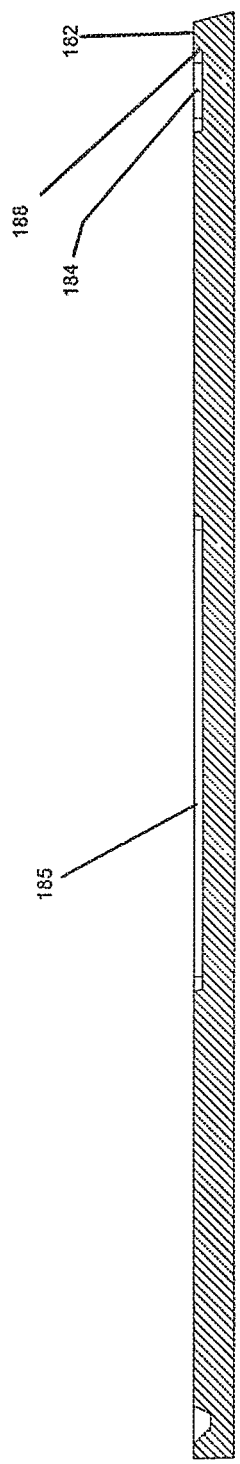
FIG. 23 is an enlarged fragmentary sectional view taken on line 23-23 of FIG. 20.

Desirably to cast a lead ribbon 124 having a surface with a plurality of circumferentially spaced apart and transversely extending cogs or ribs 128 & 128', each cavity 150 may have a plurality of circumferentially spaced apart and axially extending bars or lands 184 & 185 (FIGS. 20 & 23) in the cavity and disposed completely around the cavity. As shown in FIGS. 23 & 24, each land 184 & 185 extends generally radially outward of the base of the cavity and may have a height equal to or less than the depth of the cavity so that the outer face 186 of each land is disposed in or radially below or inboard of the peripheral surface 174 of the drum. The generally axial outer edge 188 of each cavity is desirably axially outboard of the adjacent end of the lands 184. As shown in FIGS. 23 & 24, each cavity 150 may have an axial width of about 1.6 inches, each land 184 may have an axial length of about 0.08 of an inch and a radial depth of about 0.01 of an inch, and each land 185 may have an axial length of about 0.54 of an inch and a radial depth of about 0.01 of an inch. Each land 184 and 185 may have a transverse width of about 0.035 of an inch and the lands may be circumferentially spaced apart about 0.035 of an inch (0.070 of an inch center to center). The axial space between the rows of lands 184 and 185 may be about 0.47 of an inch and the axial space between the row of lands 185 and the adjacent end of the lands 172 may be about 0.48 of an inch. The serrations, cogs, or ribs 184 & 185 ensure that while the cast ribbons are solidifying and are still being carried by the rotating drum 144, they do not move or shift generally circumferentially with respect to the portion of the strip 122 of carbon fiber on the drum to which they are joined or attached and after removal from the drum they may provide locators to facilitate further downstream processing of the elongate composite strip 120 such as for advancing the strip through a die for punching locator holes, forming lugs 130 on of the lead ribbons, pasting the composite strip, trimming the strip, cutting or severing the composite strip into individual battery electrodes, etc.

Figure 27:
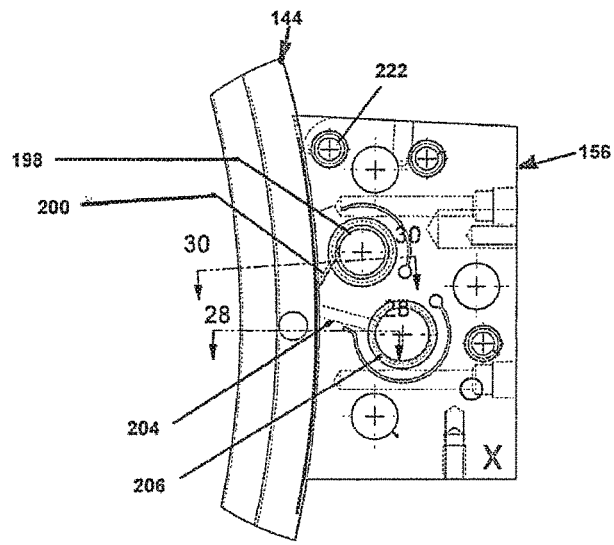
FIG. 27 is an end view of the shoe of FIG. 25 confronting the drum of FIG. 19.
Figure 28:
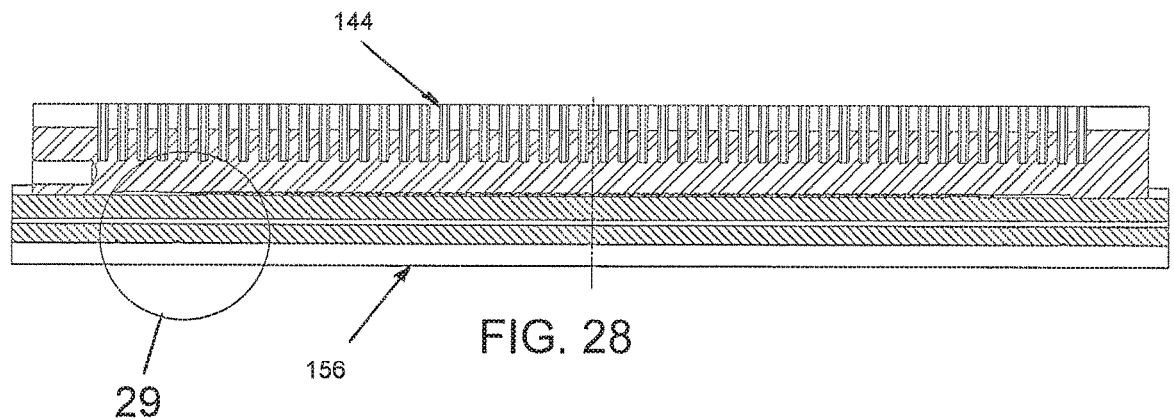
FIG. 28 is an enlarged fragmentary sectional view taken on line 28-28 of FIG. 27.
Figure 30:
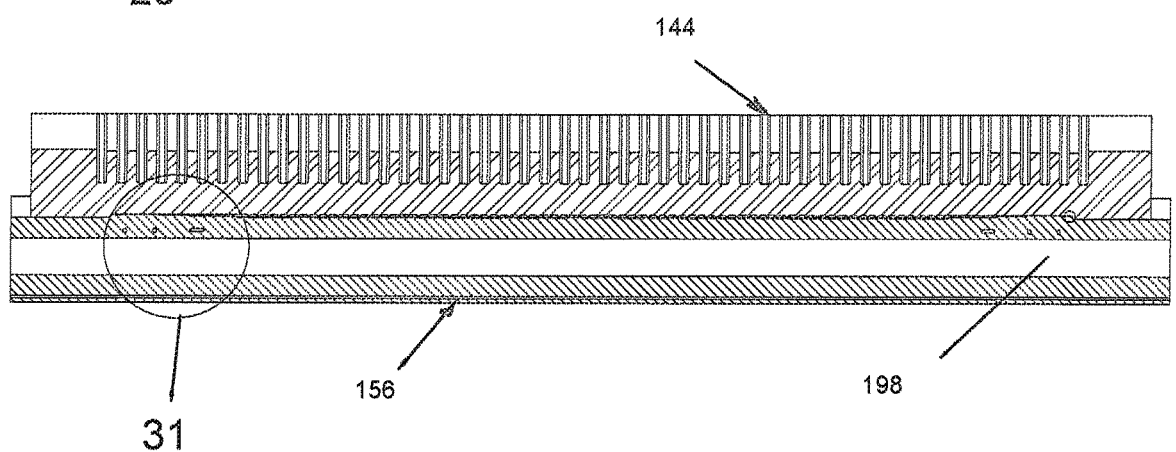
FIG. 30 is an enlarged fragmentary sectional view taken on line 30-30 of FIG. 27.
Figure 31:
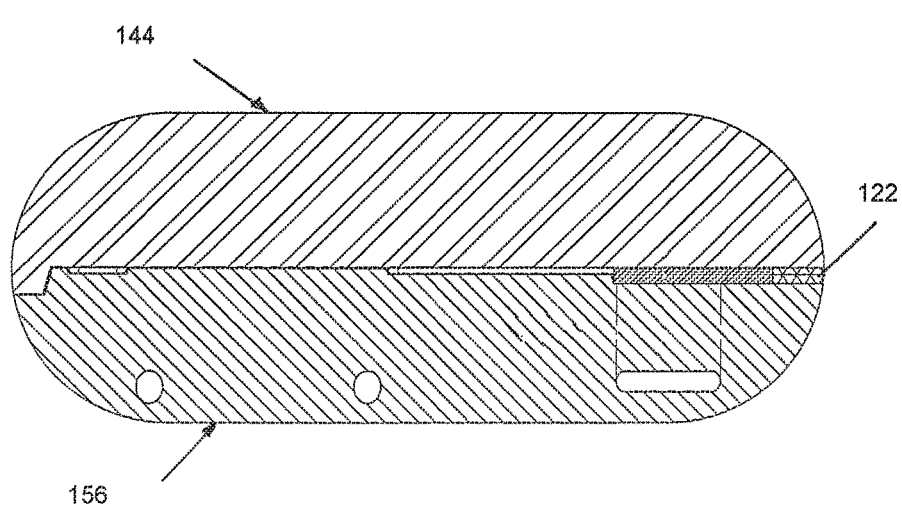
FIG. 31 is an enlarged view of the portion in the circle 31 of FIG. 30.
Figure 32:
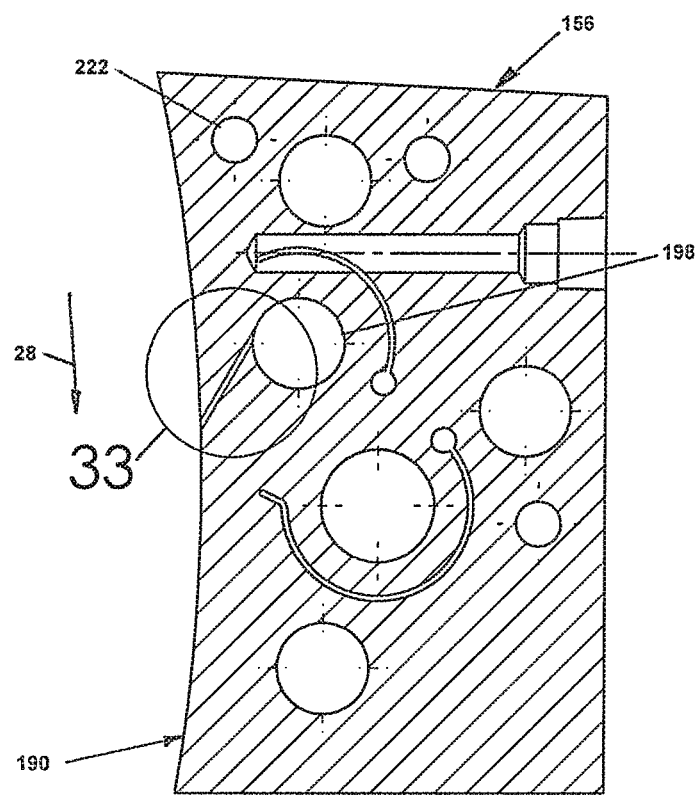
FIG. 32 is a sectional view taken on line 32-32 of FIG. 25.
Figure 33:
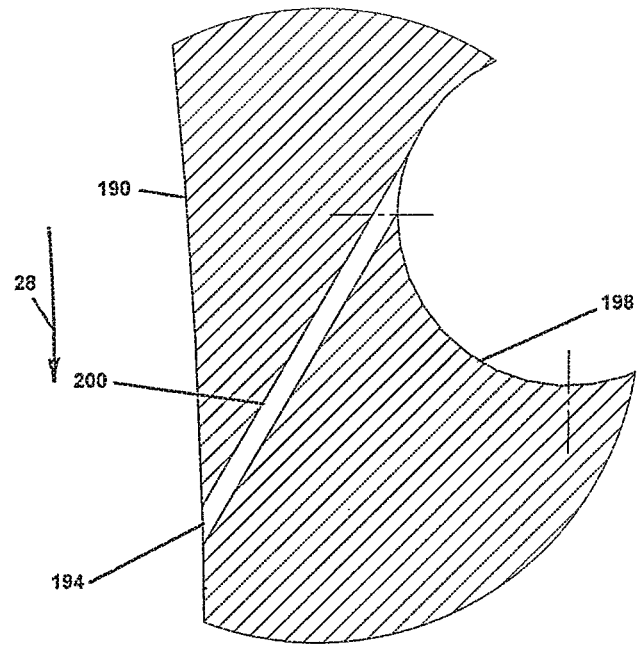
FIG. 33 is an enlarged view of the portion in the circle 33 of FIG. 32.
Figure 34:
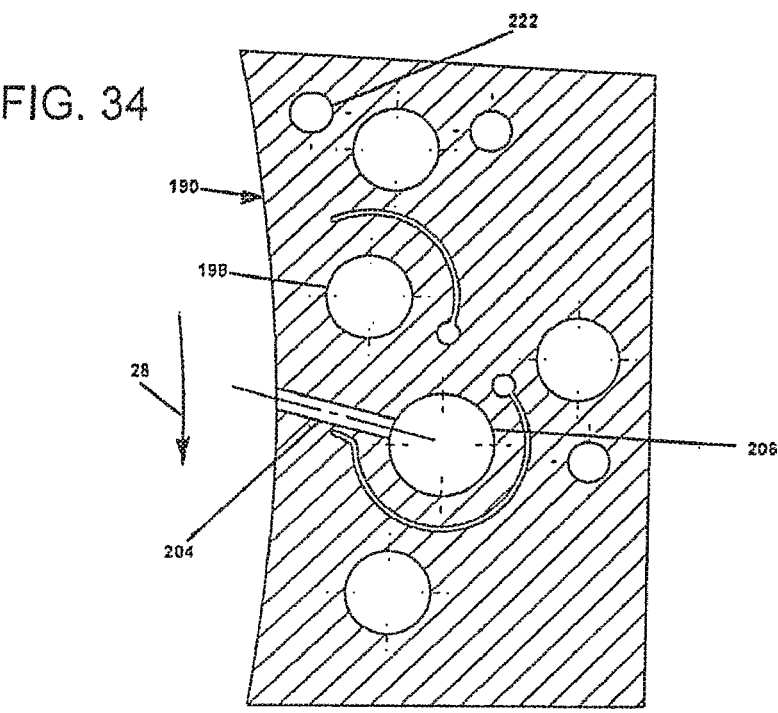
FIG. 34 is a sectional view taken on line 34-34 of FIG. 25.

In operation of the machine 20, liquid lead is supplied to each cavity 150 of the rotating drum 144 through the shoe 156. As shown in FIGS. 25 and 26 the shoe 156 has an arcuate outer face 190 for complimentary mating engagement with a portion of the periphery of the drum 144. The shoe 156 may supply liquid lead to each cavity 150 of the drum through separate orifices 192 opening through the arcuate face 190 of the shoe. Desirably each orifice 192 may have outlet openings 194 & 196, slightly spaced apart from each other. The opening 194 may have a generally rectangular configuration and may be elongate and disposed longitudinally generally parallel to the axis of rotation 28 of the drum. Typically, the opening 194 of the orifice through the face 190 has an axial extent in the range of about 0.15 to 0.25 and desirably about 0.18 of an inch and in assembly with the drum and in use (FIGS. 27-29) overlies an edge portion 126 of the strip 122 of carbon material. Two openings 196 of the orifice may be separate bores or circular each with a diameter in the range of about 0.02-0.04 and desirably about 0.03 of an inch, axially separated or spaced apart about 0.35 of an inch, and in assembly with the drum desirably overly the area between the lands 184 & 185 of the drum 144. As shown in FIGS. 25 & 26 liquid lead may be supplied under pressure to a bore or passage 198 extending generally axially through the shoe 156 which may open onto the orifice outlet openings 194 through a passage 200 which desirably has a generally rectangular cross section corresponding to and the same size as the opening 194 (0.03 by 0.18 of an inch). The passage 200 may be inclined at an acute included angle of about 60 degrees relative to a radius of the arcuate face extending through the orifice as shown in FIG. 33. Desirably each of the openings 196 communicates with the lead supply bore 198 through a separate bore which is also inclined at an acute included angle of about 60 degrees relative a radius of the arcuate face 190 extending through such opening 196. Each of the passages 200 and the bores for openings 196 extends downwardly toward its associated opening in the face relative to the direction of rotation 28 of the drum 156. In use excess liquid lead not entering the cavities is returned through each of desirably two bores or circular passages 204 (FIG. 34) each opening through the outer face 190 and communicating with an excess liquid lead discharge or outlet bore 206 extending axially through the shoe. Each return bore 204 opens into the face 190 downstream of the openings 194 and 196 relative to the direction of rotation 28 of the drum, may have a diameter of about 0.12 of an inch, may be inclined at an acute included angle of about 10 to 20 and desirably 15 degrees relative to a radius of the arc of the face extending through the opening 204, and extends downwardly away from the opening relative to the direction of rotation of the drum. Collectively the passages 194, 196, and 204 tend to direct liquid lead generally circumferentially into each cavity 150 of the rotating drum 144 and in its direction of rotation 28 to facilitate casting of the solid lead ribbons 124. Excess liquid lead flowing through the shoe 156 heats it and insures liquid lead at a desired temperature is supplied to each cavity 150.

Figure 35:
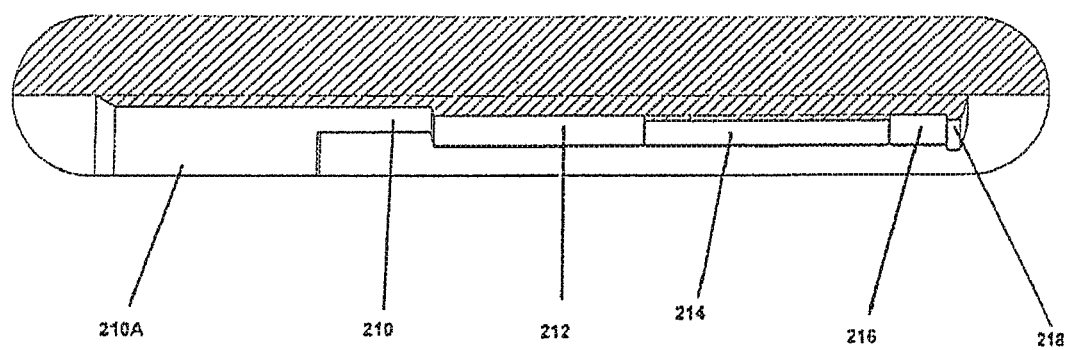
FIG. 35 is an enlarged sectional view taken on line 35-35 of FIG. 26.

In use, to inhibit liquid lead from flowing upstream relative to the direction of rotation 28 of the drum, as shown in FIGS. 26 & 35 a series of ribs 210, 212, 214, 216, and 218 project outwardly from the face 190 of the shoe 156 and extend generally upward of the orifice 192 relative to the direction of rotation 28 of the drum. In operation of the machine 20, the rib 218 may also tend to inhibit and reduce the extent of outward axial flow of liquid lead from the outlets 196 of each cavity 150. In operation of the machine 20, the extent of the axial flow of liquid lead into the carbon fiber strip 122 may also be reduced by compression of a proportion this strip between the circumferential portion 210A of the rib 210 which portion 210A may extend downstream of the orifice 194 of the shoe. However, the extent of this compression must be limited so that the carbon fiber material is not torn or unduly stressed by movement of it by the drum 144 relative to the shoe 156. The extent to which this compression of the carbon fiber material must be limited to avoid tearing or undue stretching of the carbon fiber material may need to be empirically determined depending on various factors including the thickness and density of the strip 122 of the carbon fiber material, the speed at which the drum 144 rotates, the width of this rib portion 210A, etc. It is believed the carbon fiber material may be compressed to 30% to 50% of its uncompressed nominal thickness. For a carbon fiber material having a nominal thickness of about 0.060 of an inch, a rib portion 210A with an axial width of about 0.4 of an inch, and a rotary drum 144 periphery tangential speed of about 80 to 100 lineal feet per minute, a compression of the strip to a thickness of about 0.020 of an inch has been empirically determined to be satisfactory. Suitable carbon fiber materials are believed to be disclosed in U.S. Pat. No. 9,543,589 the disclosure of which is incorporated herein by reference.

If desired to reduce oxidation of the liquid lead during casting of the ribbons an inert gas such as nitrogen may be injected into the casting area such as through small passages 220 of about 0.03 of an inch in diameter opening through ribs 212 and 214 upstream of the orifice relative to the direction of rotation of the drum. The passages 220 may communicate with a bore 222 extending axially through the shoe to which the inert gas may be supplied at a flow rate typically in the range of about 10 to 40 standard cubic feet per hour.

Figure 36:
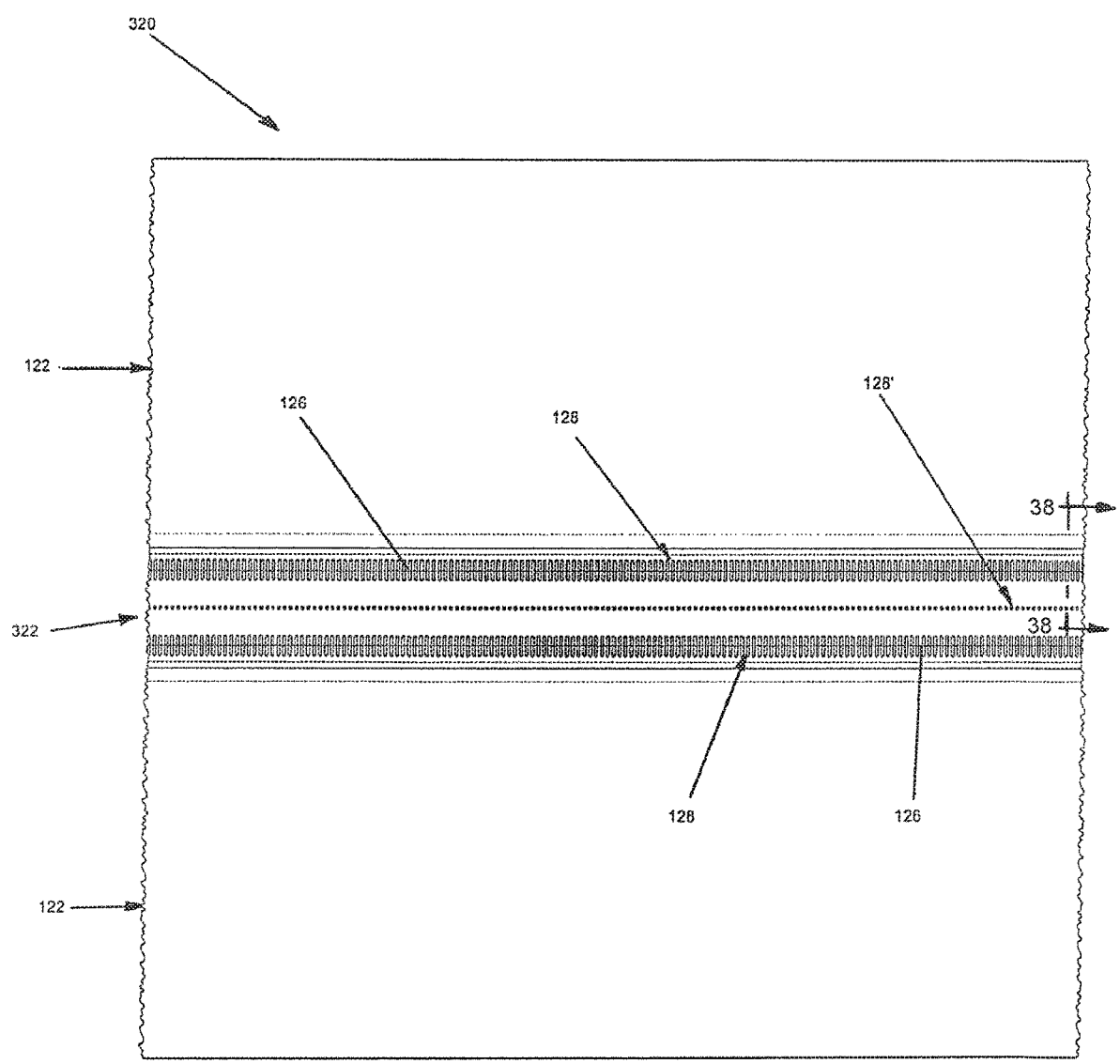
FIG. 36 is a fragmentary plan view of another longitudinally elongate composite strip of a carbon fiber material with a lead conductor ribbon along the mid portion thereof.
Figure 37:
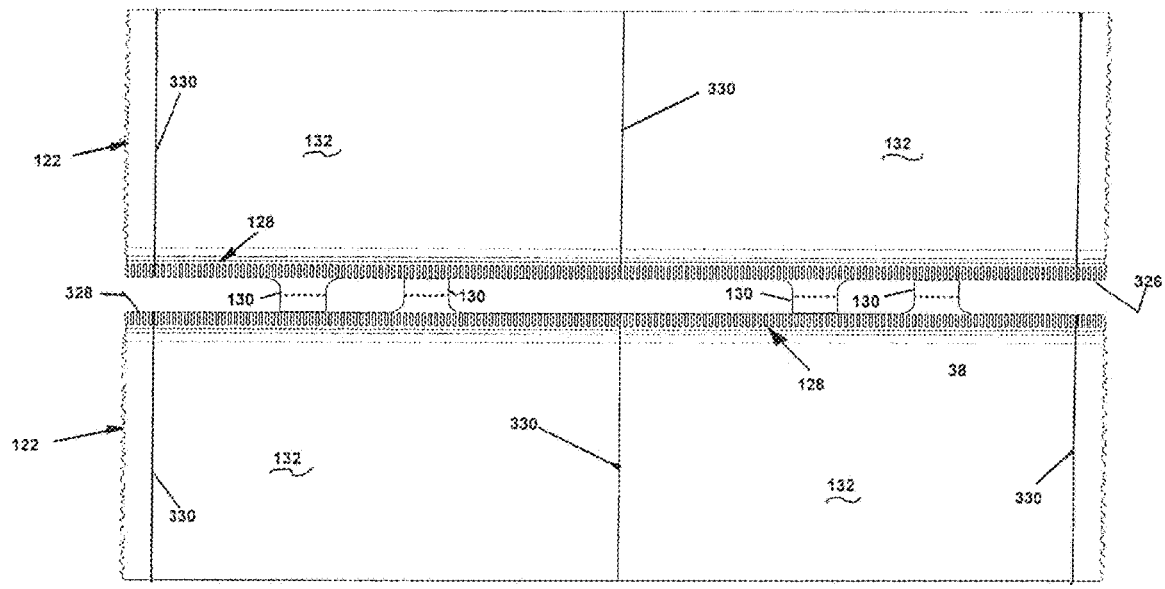
FIG. 37 is a fragmentary plan view of the longitudinally elongate composite strip of FIG. 36 with lugs of the conductor ribbon.
Figure 38:
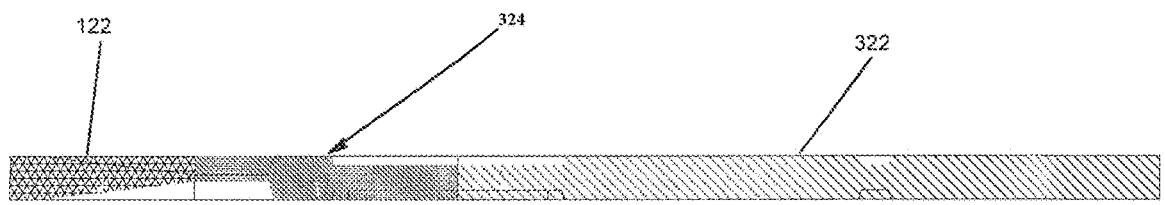
FIG. 38 is a fragmentary sectional view taken on line 38-38 of FIG. 36.

FIG. 36 illustrates another longitudinally elongate composite web or strip 320 of two parallel strips 122 of electrically conductive fiber material with a longitudinally elongate electrically conductive cast lead or lead alloy ribbon 322 attached to their adjacent longitudinal edges 126. The lead ribbon 322 may have two sets of locator indicia desirably in the form of uniformly longitudinally spaced apart and transversely extending ribs 128 and desirably a center transverse rib 128' formed when casting the lead ribbon 322 to the carbon fiber material strips 122. As shown in FIG. 37, after casting and solidification of the lead ribbon 322, it may be generally longitudinally separated and longitudinally spaced apart lugs 130 may be formed on the ribbon by stamping, punching, cutting, severing, or otherwise cutting away portions of the cast ribbon 322 to form the lugs. To form individual composite electrodes 132 of carbon fiber material 122 with a lead ribbon attached along one edge, the elongate web or strip 320 may be severed generally longitudinally along lines 326 & 328 and transversely along lines 330.

Figure 39:
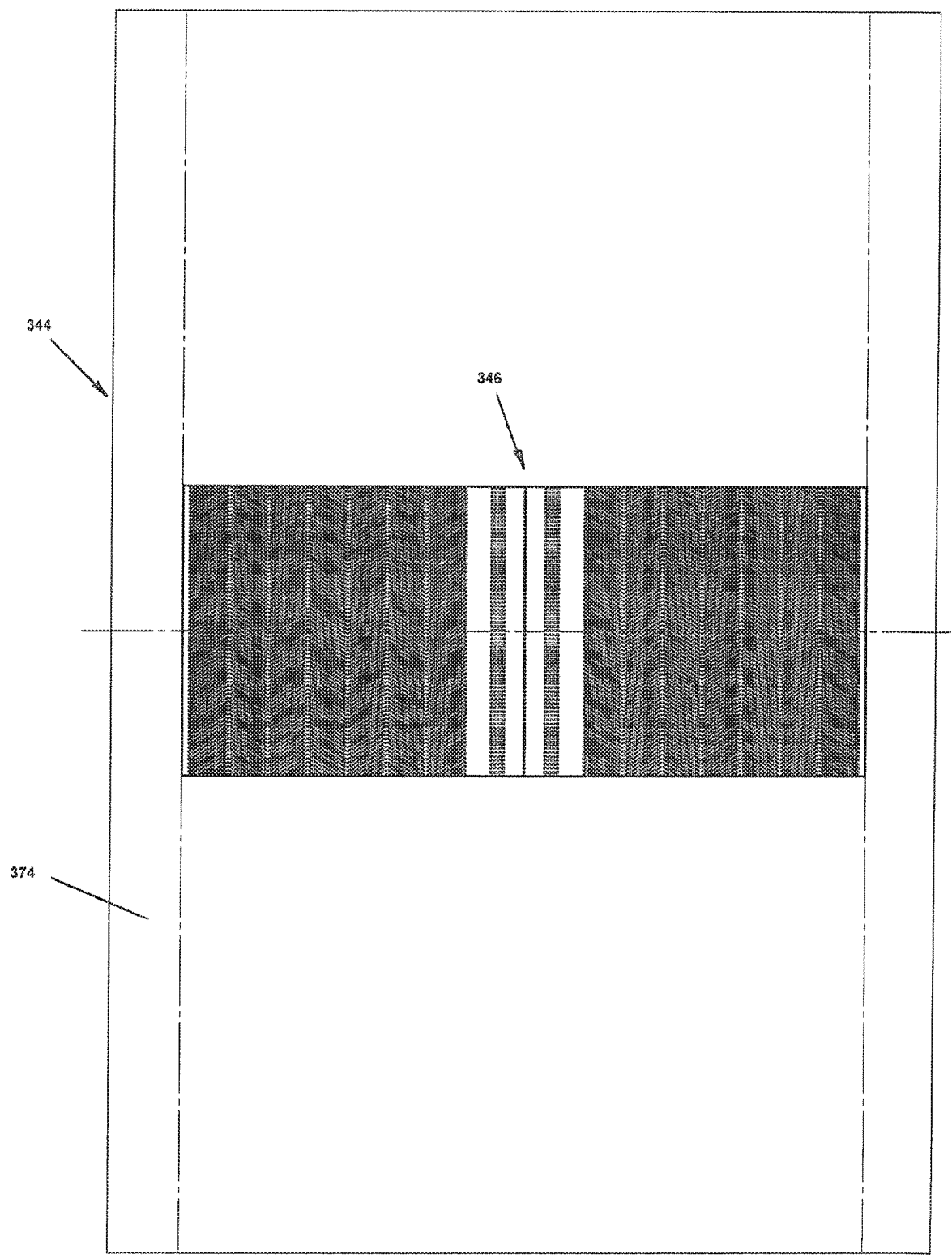
FIG. 39 is a side view of a casting drum including a portion of its cavity for casting the conductor ribbon on the carbon fiber material of the composite strip of FIG. 36.
Figure 40:
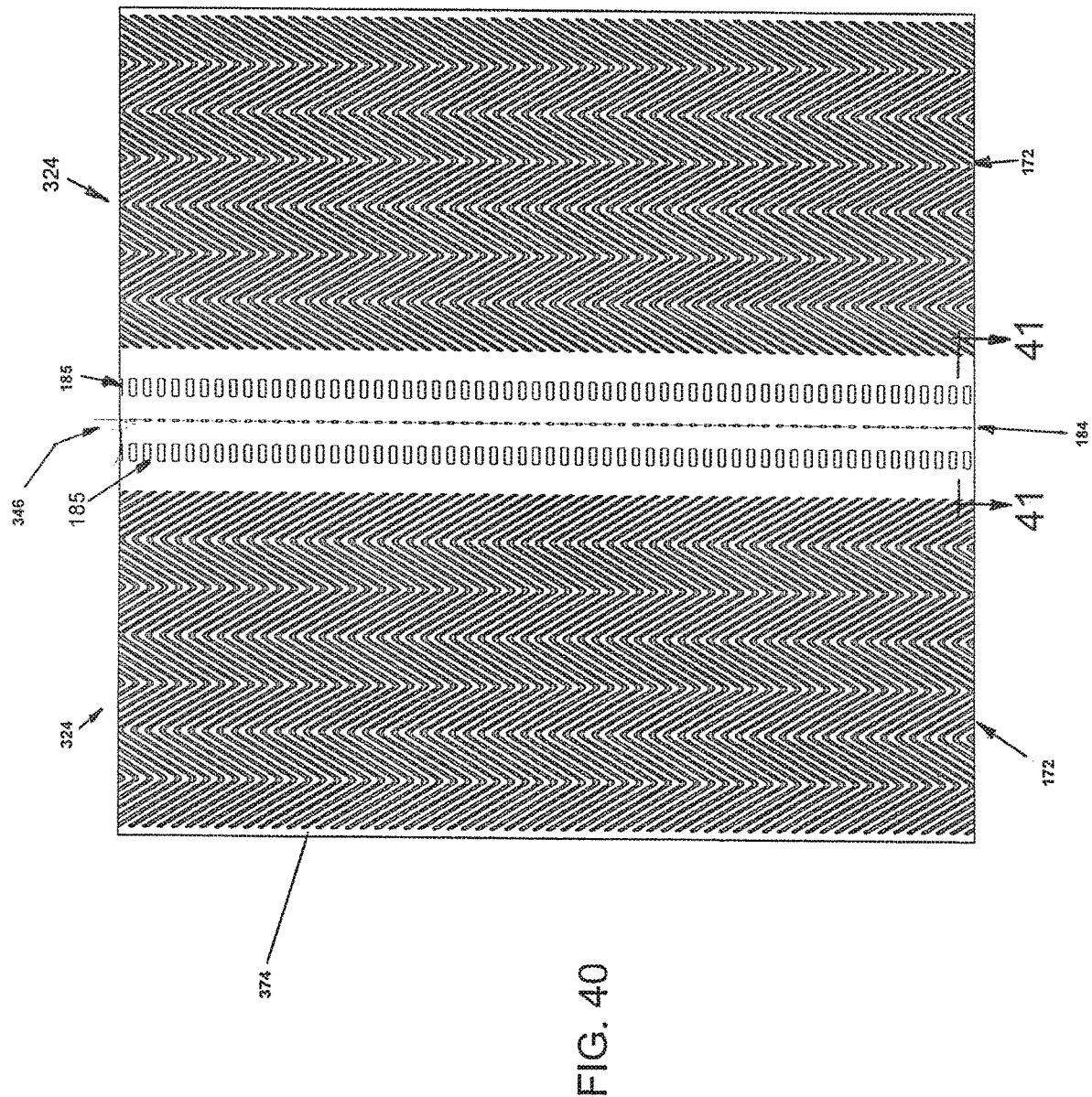
FIG. 40 is an enlarged view of a portion of the periphery of the casting drum of FIG. 39.

A casting drum 344 (FIG. 39) and a complimentary shoe 356 (FIG. 42) may be used with the machine 20 to continuously cast the conductive lead or lead alloy ribbon 322 attached to adjacent edges of two longitudinally elongate strips 122 of carbon fiber material. Portions of the two longitudinally elongate strips 122 of carbon fiber material may be received in parallel on the casting drum 344 and the drum may have a cavity 346 (which may be substantially two cavities 150 merged together) to continuously cast the lead ribbon 322 attached to the two strips 122. As shown in FIGS. 17 and 18, each of two rolls 152 of the carbon fiber material may be unwound and disposed on the rotating drum by one or two parallel uncoiling devices 154. In operation of the machine 20, liquid lead may be supplied through the shoe 356 to the cavity 346 to cast and attach the lead ribbon 322 along the adjacent edges 126 of the two strips 122 of carbon fiber material. Liquid lead under pressure may be supplied from the lead pot 44 of the melting furnace 46 by the pump 42 to the shoe 356. A portion of each carbon fiber strip 122 of material may be retained on the drum 344 while casting the lead ribbon 322 thereon, as shown in FIGS. 39 and 40, by two axially spaced apart rows 324 each of a plurality of circumferentially spaced apart lands 172 arranged in a zig zag pattern and disposed circumferentially continuously around a peripheral surface 374 of the drum. In operation of the machine 20, the unwinding device or devices 154 dispose succeeding portions of the two carbon fiber strips 122 in parallel onto the rotating drum 344 and into engagement with the lands 172.

Figure 41:
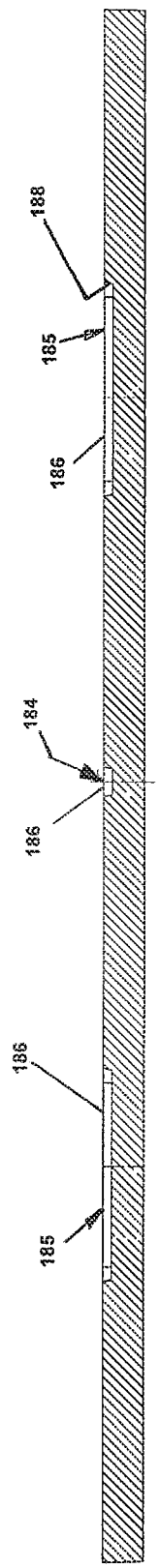
FIG. 41 is an enlarged fragmentary sectional view taken on line 41-41 of FIG. 40 of a casting cavity of the drum of FIG. 39.

For casting the lead ribbon 322, the drum 344 may have a cavity 346 (FIGS. 39-41) between the lands 172 and recessed in and extend circumferentially continuously around the peripheral surface of the drum. The cavity 346 underlaps and in conjunction with the shoe may also overlap adjacent edges 126 of the two strips 122 of carbon fiber material. As shown in FIG. 47, to at least some extent, the liquid lead penetrates into a portion of each strip of carbon fiber material and when solidified attaches or secures the lead ribbon 322 to the strips of carbon fiber material and provides an electrically conductive path or conductor for the carbon fiber material. In some instances, the liquid lead may saturate at least part of each strip of carbon-fiber material.

Desirably to cast the lead ribbon 322 with a surface having two spaced apart sets each of a plurality of circumferentially spaced apart and transversely extending cogs or ribs 128, and ribs 128', the cavity 346 may have two spaced apart sets each with a plurality of circumferentially spaced apart and axially extending bars or lands 185 (FIGS. 40 & 41) in the cavity and disposed completely around the cavity. Optionally, the cavity 346 may also have a row of circumferentially spaced apart bars 184 disposed completely around the cavity and axially spaced from and between the two rows of lands 185. Each of the lands 184 and 185 extends generally radially outward of the base of the cavity and may have a height equal to or less than the depth of the cavity so that the outer face 186 of each land is disposed in or radially below or inboard of the peripheral surface 374 of the drum. The generally axial outer edges 188 of the cavity are desirably axially outward of the lands 185. The cavity 346 may have an axial width of about 1.7 inches. The lands 184 and 185 ensure that while the lead is solidifying and while the ribbon 322 is still being carried by the rotating drum 344 it does not slip or move generally circumferentially with respect to the portion of the two strips 122 of carbon fiber material on the drum to which it is joined or attached, and after removal from the drum the ribs 185 may provide locators to facilitate further downstream processing of the elongate composite strip 320 such as advancing the strip through a die for punching locator holes, forming lugs 130 on the ribbon, pasting the composite strip, trimming the composite strip, cutting or severing the composite strip into individual battery electrodes, etc.

Figure 42:
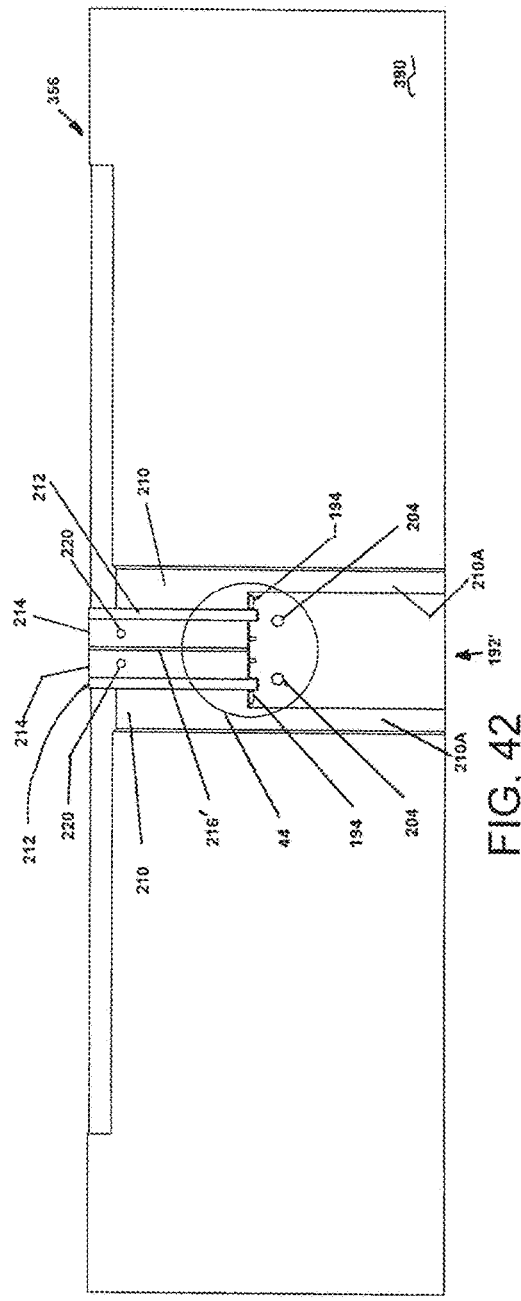
FIG. 42 is a front view of a shoe for use with the casting drum of FIG. 39.
Figure 43:
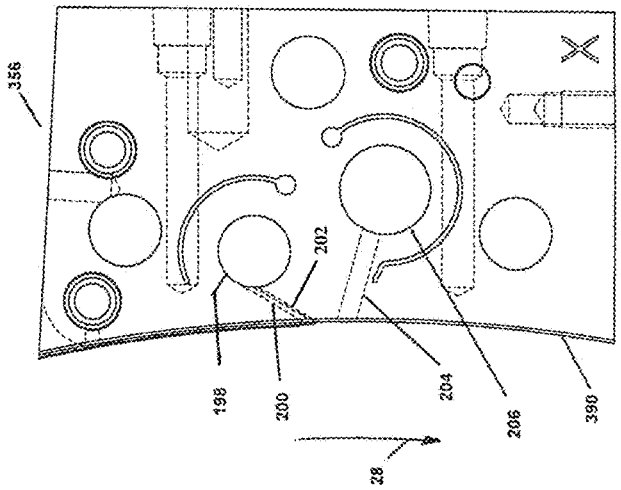
FIG. 43 is an end view of the shoe of FIG. 42.
Figure 44:
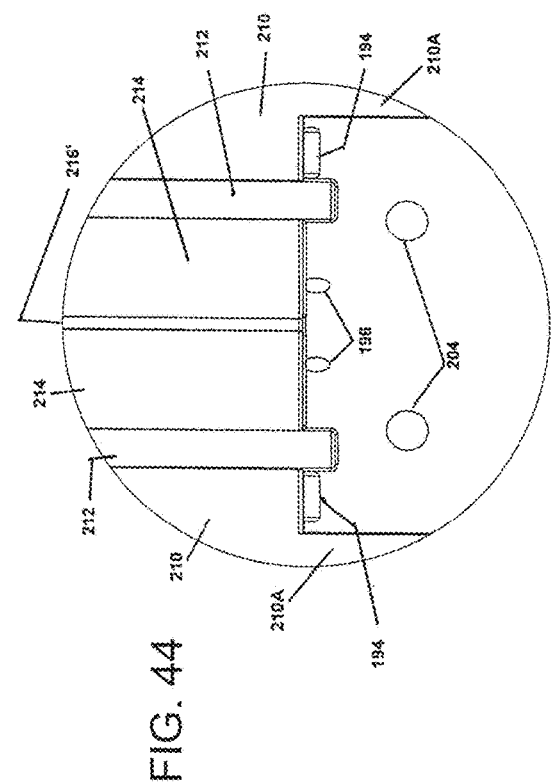
FIG. 44 is an enlarged front view of the mid portion of the shoe in the circle 44 of FIG. 42.
Figure 45:
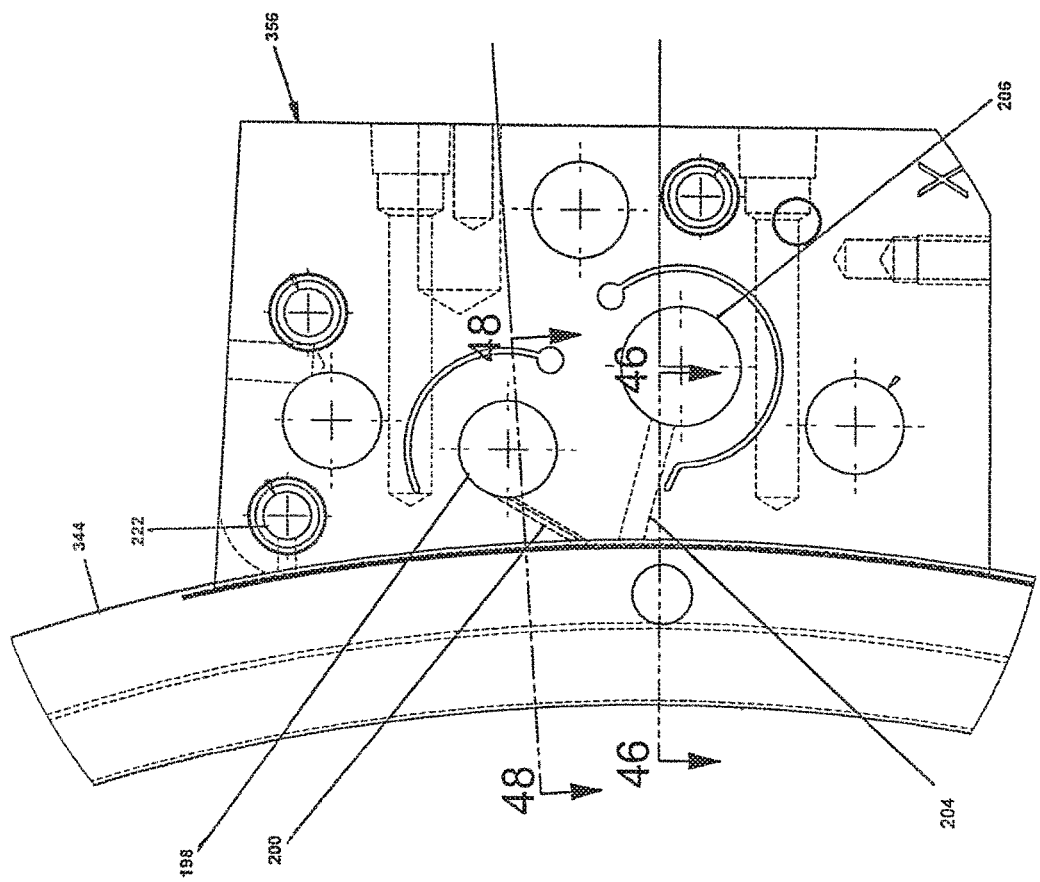
FIG. 45 is an end view of the shoe of FIG. 42 confronting the drum of FIG. 39.

In operation in the machine 20, liquid lead is supplied to the cavity 346 of the rotating drum 344 through the shoe 356. As shown in FIGS. 42 and 43 the shoe 356 has an arcuate outer face 390 for complimentary mating engagement with a portion of the periphery of the drum 344. The shoe 356 may supply liquid lead to the cavity 346 of the drum through desirably an orifice 192' which may have outlet openings 194 and 196 axially spaced apart from each other. As shown in FIG. 44, the openings 194 may have a generally rectangular configuration and may be elongate and disposed longitudinally generally parallel to the axis of rotation of the drum 344. Desirably in assembly the openings 194 may overlie a portion of the carbon fiber strips 122 axially outward of the lands 185. The openings 196 may be separate bores or circular, axially spaced apart from each other and in assembly with the drum 344 desirably overlie the area between the lands 185 of the drum. As shown in FIG. 43, liquid lead may be supplied under pressure to a bore or passage 198 extending generally axially through the shoe 356 and which may open onto each of the orifice outlet openings 194 through a separate passage 200 for each opening which desirably has a generally rectangular cross-section corresponding to and the same size and cross-sectional shape as the openings 194 (0.03 by 0.18 of an inch). The passage 200 may be inclined at an acute included angle of 50° to 70° and desirably about 60° relative to a radius of the arcuate face 390 extending through the orifice opening 194. Desirably, each of the openings 196 communicates with the lead supply bore 198 through a separate bore 202 which also may be inclined at an acute included angle of about 60 degrees relative to a radius of the arcuate face 390 extending through such opening 196. Each of the passages 200 and 202 extends downwardly toward its associated opening in the face 390 relative to the direction of rotation 28 of the drum 356.

In use, excess liquid lead not entering the cavity 346 is returned through each of desirably at least two bores or circular passages 204 (FIGS. 44 & 42) each opening through the outer face 390 and communicating with a liquid lead return or outlet bore 206 extending axially through the shoe 356. Each return bore 204 opens into the face 390 downstream of the openings 194 and 196 relative to the direction of rotation 28 of the drum 344, may be inclined at an acute included angle of about 10 to 20 and desirably 15 degrees relative to a radius of the arcuate face 390 extending through the opening 204, and extends downwardly away from the opening 204 relative to the direction of rotation of the drum 344. Collectively, the passages 194, 196, and 204 tend to direct liquid lead generally circumferentially into the cavity 346 of the rotating drum 344 and in its direction of rotation to facilitate casting of the lead ribbon 322. Excess liquid lead flowing through the shoe 356 heats it and ensures liquid lead at a desired temperature is supplied to the cavity 346.

In use, to inhibit liquid lead from flowing upstream relative to the direction of rotation 28 of the drum 344, the shoe 356 has as shown in FIGS. 42 & 44, a series of ribs 210, 212, 214, and 216' projecting outward from the face 390 of the shoe 356 and extending generally upward of the orifice 192' relative to the direction of rotation of the drum. In assembly rib 216' overlies the row of lands 184 of the drum. In operation of the machine 20, the extent of axial flow of liquid lead outwardly into the carbon fiber strip 122 may be controlled by compression of a portion of this strip between the circumferential portion 210A of the rib 210 (which portion 210A may extend downstream of the orifice 194 of the shoe) and the drum 344. However, as previously noted the extent of this compression must be limited so that the carbon fiber material is not torn or unduly stressed by movement of the drum 344 relative to the shoe 356. If desired to reduce oxidation of the liquid lead during casting and solidification of the ribbon 322, an inert gas such as nitrogen may be injected into the casting area such as through small passages 220, opening through the ribs 214 upstream of the orifice relative to the direction of rotation of the drum. The passages 220 may communicate with a bore 222 extending axially through the shoe 356 to which an inert gas may be supplied at a flow rate typically in the range of about 10 to 40 standard cubic feet per hour.

In assembly and use, the interface between the drum 344 and the shoe 356 is shown in FIGS. 46-49.

While the molten or liquid metal has been primarily referred to as lead or a lead alloy many other metals may provide an electrically conductive metal strip such as one of zinc, calcium, aluminum, sodium, magnesium, lithium, manganese, bismuth, selenium, antimony, and alloys thereof.

As used herein, the terms "general," "generally," and "approximately" are intended to account for the inherent degree of variance and imprecision that is often attributed to, and often accompanies, any design and manufacturing process, including engineering tolerances, and without deviation from the relevant functionality and intended outcome, such that mathematical precision and exactitude is not implied and, in some instances, is not possible.

The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A process of making a composite battery electrode, said process comprising:
    providing a longitudinally elongate strip of an electrically conductive carbon fiber material;
    continuous casting an electrically conductive metal ribbon along and attached to a longitudinally elongate edge of the strip of carbon fiber material via a casting shoe, the casting shoe comprising:
        a shoe body with a face configured to confront a rotary drum of a battery electrode continuous casting machine and extending axially over at least an axial extent of at least one mold cavity of the rotary drum;
        at least one orifice slot in the body and opening into a confronting face of the body with an opening made by the at least one orifice slot being elongate parallel to an axis of rotation of the rotary drum and the at least one orifice slot configured to supply molten metal into the at least one mold cavity and into engagement with a portion of the strip of carbon fiber material;
        at least one elongate molten metal supply passage opening into the at least one orifice slot and extending longitudinally upstream of the confronting face and the opening made by the at least one orifice slot relative to a direction of rotation of the rotary drum past the at least one orifice slot;
        at least one longitudinally elongate excess molten metal return passage separate from the at least one orifice slot and the at least one supply passage and opening into the confronting face downstream of the opening made by the at least one orifice slot into the confronting face relative to the direction of rotation of the rotary drum past the at least one orifice slot;
        a molten metal supply passage having an inlet adjacent one of its ends, an outlet adjacent the other of its ends, and communicating with the at least one supply passage opening into the at least one orifice slot; and
        an excess return passage in the body separate from the molten metal supply passage, having a molten metal inlet adjacent one of its ends, a molten metal outlet adjacent the other of its ends, communicating with the at least one return passage opening into the confronting face, and being configured to receive excess molten metal from the at least one return passage opening into the confronting face and discharge such excess molten metal through the outlet of the excess return passage; and
    severing the strip of carbon fiber material with an attached electrically conductive metal ribbon into a plurality of electrodes each with a portion of the strip of carbon fiber material with a portion of the ribbon attached thereto.

2. The process of claim 1 which also comprises providing another longitudinally elongate strip of an electrically conductive carbon fiber material and continuously casting the electrically conductive ribbon along and attached to adjacent longitudinally elongate edges of both strips of carbon fiber material.

3. The process of claim 1, wherein the at least one supply passage of the casting shoe is inclined downwardly relative to the direction of rotation of the rotary drum past the at least one orifice slot at an acute included angle relative to an imaginary radius of the rotary drum extending through a center of a circumferential width of the opening of the at least one orifice slot into the confronting face.

4. The process of claim 3, wherein the acute included angle of the at least one supply passage is in the range of 50°-70°.

5. The process of claim 3, wherein the at least one return passage is inclined downwardly relative to the direction of rotation of the rotary drum and away from the confronting face at an acute included angle relative to an imaginary radius of the rotary drum extending through the center of the circumferential width of the opening made by the at least one return passage into the confronting face.

6. The process of claim 1, wherein the at least one return passage is inclined downwardly relative to the direction of rotation of the rotary drum and away from the confronting face at an acute included angle relative to an imaginary radius of the rotary drum extending through a center of a circumferential width of the opening made by the at least one return passage into the confronting face.

7. The process of claim 6, wherein the acute included angle of the at least one return passage is in the range of about 20°-30°.

8. The process of claim 1, wherein the excess return passage is configured to receive a supply of molten metal through its inlet and to discharge such molten metal and excess molten metal from the at least one return passage opening into the confronting face through the outlet of the excess return passage.

9. The process of claim 1, wherein the casting shoe is configured to cast molten metal of at least one of lead, zinc, calcium, aluminum, sodium, magnesium, lithium, manganese, bismuth, selenium, antimony, and alloys thereof.

10. The process of claim 1, which also comprises compressing a portion of the carbon fiber material onto which molten metal is applied by at least 30% of its uncompressed thickness at least while molten metal is flowed thereon.

11. A process of making a composite battery electrode, said process comprising:
   providing a longitudinally elongate strip of an electrically conductive carbon fiber material;
   continuous casting an electrically conductive metal ribbon along and attached to a longitudinally elongate edge of the strip of carbon fiber material via a casting shoe continuously flowing molten metal at a super atmospheric pressure onto the strip of carbon fiber material as the casting shoe and the strip of carbon fiber material are relatively continuously advanced one to the other, the casting shoe comprising:
      a shoe body with a face configured to confront a rotary drum of a battery electrode continuous casting machine and extending axially over at least an axial extent of a mold cavity of the rotary drum;
      at least one orifice slot with an elongate opening into a confronting face of the body;
      at least one longitudinally elongate molten metal supply passage opening into the at least one orifice slot along at least substantially the extent of the elongate opening of the at least one orifice slot into the confronting face and extending upstream of the elongate opening into the confronting face relative to a direction of flow of molten metal through the elongate opening;
      an excess molten metal return passage separate from the at least one molten metal supply passage and opening into the confronting face downstream of the elongate opening into the confronting face of the at least one orifice slot relative to a direction of rotation of the rotary drum; and
      an excess return passage in the body separate from the at least one molten metal supply passage, communicating with the return passage opening into the confronting face, having a molten metal inlet adjacent one of its ends, a molten metal outlet adjacent the other of its ends, and being configured to receive excess molten metal from the return passage opening into the confronting face and to discharge such excess molten metal through the molten metal outlet of the excess return passage, wherein the excess return passage is configured to receive a supply of molten metal through its inlet and to discharge such molten metal and excess molten metal from the return passage opening into the confronting face through the outlet of the excess return passage; and
   severing the strip of carbon fiber material with an attached electrically conductive metal ribbon into a plurality of electrodes each with a portion of the strip of carbon fiber material with a portion of the ribbon attached thereto.

12. The process of claim 11 which also comprises providing another longitudinally elongate strip of an electrically conductive carbon fiber material and continuously casting the electrically conductive ribbon along and attached to adjacent longitudinally elongate edges of both strips of carbon fiber material.

13. The process of claim 11 which also comprises compressing a portion of the carbon fiber material onto which molten metal is applied by at least 30% of its uncompressed thickness at least while molten metal is flowed thereon.

14. The process of claim 11, wherein the casting shoe also comprises a molten metal supply passage in the shoe body and communicating with the at least one supply passage opening into the at least one orifice slot, having an inlet adjacent one of its ends, an outlet adjacent the other of its ends.

15. The process of claim 14, wherein the molten metal supply passage extends axially through the shoe body and is configured to receive the molten metal at the super atmospheric pressure through its inlet and to discharge through its outlet excess molten metal not supplied to the at least one orifice slot.

16. The process of claim 11, wherein the at least one supply passage of the casting shoe is inclined downwardly relative to the direction of rotation of the rotary drum past the at least one orifice slot at an acute included angle relative to an imaginary radius of the rotary drum extending through a center of a circumferential width of the opening of the at least one orifice slot into the confronting face.

17. The process of claim 16, wherein the return passage is inclined downwardly relative to the direction of rotation of the rotary drum and away from the confronting face at an acute included angle relative to an imaginary radius of the rotary drum extending through the center of the circumferential width of the opening made by the return passage into the confronting face.

18. The process of claim 11, wherein the return passage is inclined downwardly relative to the direction of rotation of the rotary drum and away from the confronting face at an acute included angle relative to an imaginary radius of the rotary drum extending through a center of a circumferential width of the opening made by the return passage into the confronting face.

19. The process of claim 11, wherein the ratio of a minimum cross-sectional flow area of the opening of the at least one orifice slot into the confronting face to a minimum cross-sectional flow area of the at least one supply passage opening into the at least one orifice slot is in the range of 8:1 to 15:1.

20. The process of claim 11, wherein the casting shoe also comprises an axially elongate molten metal return supply tube received in the excess return passage and having an outside diameter smaller than an inside diameter of the excess return passage and a nozzle adjacent the molten metal outlet of the excess return passage.

* * * * *